US011958687B2

(12) United States Patent
Ji

(10) Patent No.: US 11,958,687 B2
(45) Date of Patent: Apr. 16, 2024

(54) HIGH-POSITION ROBOT, METHOD FOR CALIBRATING RETURN OF STORAGE CONTAINER, AND STORAGE MEDIUM

(71) Applicant: BEIJING GEEKPLUS TECHNOLOGY CO. LTD, Beijing (CN)

(72) Inventor: Bin Ji, Beijing (CN)

(73) Assignee: BEIJING GEEKPLUS TECHNOLOGY CO. LTD, Beijing (CN)

( * ) Notice: Subject to any disclaimer, the term of this patent is extended or adjusted under 35 U.S.C. 154(b) by 400 days.

(21) Appl. No.: 17/600,544

(22) PCT Filed: Aug. 27, 2019

(86) PCT No.: PCT/CN2019/102910
§ 371 (c)(1),
(2) Date: Sep. 30, 2021

(87) PCT Pub. No.: WO2020/199471
PCT Pub. Date: Oct. 8, 2020

(65) Prior Publication Data
US 2022/0177222 A1 Jun. 9, 2022

(30) Foreign Application Priority Data

Apr. 2, 2019 (CN) .......................... 201910262867.7
Apr. 4, 2019 (CN) .......................... 201910272981.8

(51) Int. Cl.
B66F 9/075 (2006.01)
B65G 1/04 (2006.01)

(52) U.S. Cl.
CPC .......... *B65G 1/0421* (2013.01); *B66F 9/0755* (2013.01); *B65G 2203/0233* (2013.01); *B65G 2203/0283* (2013.01); *B65G 2203/041* (2013.01)

(58) Field of Classification Search
CPC ........... B65G 1/0421; B65G 2203/041; B65G 2203/0283; B65G 2203/0233; B66F 9/075; B66F 9/0755
See application file for complete search history.

(56) References Cited

U.S. PATENT DOCUMENTS 9,488,986 B1 11/2016 Solanki
2011/0088979 A1 4/2011 Bandringa et al.
(Continued)

FOREIGN PATENT DOCUMENTS

CN 102616703 8/2012
CN 104129735 11/2014
(Continued)

OTHER PUBLICATIONS

CNIPA, First Office Action for CN Application No. 201910272981. 8, dated Nov. 27, 2019.
(Continued)

*Primary Examiner* — Kaitlin S Joerger
(74) *Attorney, Agent, or Firm* — Hodgson Russ LLP

(57) ABSTRACT

The high-position robot includes a pallet fork; an image collector and a distance sensor are arranged on the pallet fork; the image collector is configured to collect positioning information provided on a target stock container and obtain image data representing a positional relationship between the pallet fork and a projection image of the positioning information on a specified plane; and the distance sensor is configured to measure a distance between the pallet fork and a target stock container and obtain distance data. After a
(Continued)

pallet fork lifts a storage container to be placed up to a same height as a target layer of a target stock container, adjusting and controlling a positional relationship between the pallet fork and a projection image of positioning information on a specified plane; and adjusting and controlling a distance between the pallet fork and the target stock container according to distance data.

16 Claims, 15 Drawing Sheets

(56) References Cited

U.S. PATENT DOCUMENTS

| | | | |
|---|---|---|---|
| 2011/0218670 | A1 | 9/2011 | Bell et al. |
| 2014/0377050 | A1* | 12/2014 | Hellenbrand ........ B65G 1/0435 414/807 |
| 2016/0090283 | A1* | 3/2016 | Svensson .............. B66F 9/0755 701/50 |
| 2017/0015537 | A1* | 1/2017 | Bosworth, III ....... B66F 9/0755 |
| 2018/0089616 | A1* | 3/2018 | Jacobus ........... G06K 19/06037 |
| 2018/0143624 | A1* | 5/2018 | Schulz ...................... B66F 9/24 |
| 2018/0359405 | A1 | 12/2018 | Clayton et al. |
| 2019/0070733 | A1* | 3/2019 | Barth .................. G05D 1/0246 |
| 2019/0197738 | A1* | 6/2019 | Kishita ..................... G06T 7/90 |
| 2021/0158466 | A1* | 5/2021 | Li .......................... G06V 20/58 |
| 2022/0177222 | A1* | 6/2022 | Ji ......................... B65G 1/0421 |
| 2022/0281726 | A1* | 9/2022 | Weichselgartner .. G05D 1/0246 |

FOREIGN PATENT DOCUMENTS

| | | |
|---|---|---|
| CN | 106672859 | 5/2017 |
| CN | 106764689 | 5/2017 |
| CN | 206436927 | 8/2017 |
| CN | 206735721 | 12/2017 |
| CN | 108502810 | 9/2018 |
| CN | 108545669 | 9/2018 |
| CN | 108584809 | 9/2018 |
| CN | 108712990 | 10/2018 |
| CN | 108791439 | 11/2018 |
| CN | 109415194 | 3/2019 |
| CN | 109969989 | 7/2019 |
| CN | 109987550 | 7/2019 |
| DE | 102004001198 | 8/2005 |
| EP | 0881191 | 12/1998 |
| EP | 2468678 A1 | 6/2012 |
| EP | 3192616 | 7/2017 |
| FR | 2691116 | 8/1994 |
| JP | 2001199698 | 7/2001 |

OTHER PUBLICATIONS

CNIPA, First Office Action for CN Application No. 201910262867. 7, dated Nov. 14, 2019.
CNIPA, Notification to Grant Patent Right for Invention for CN Application No. 201910272981.8, dated Feb. 20, 2021.
WIPO, International Search Report and Written Opinion for International Application No. PCT/CN2019/102910, dated Jan. 8, 2020.
EPO, Extended European Search Report for EP Application No. 19923051.7, dated Dec. 1, 2022.

\* cited by examiner

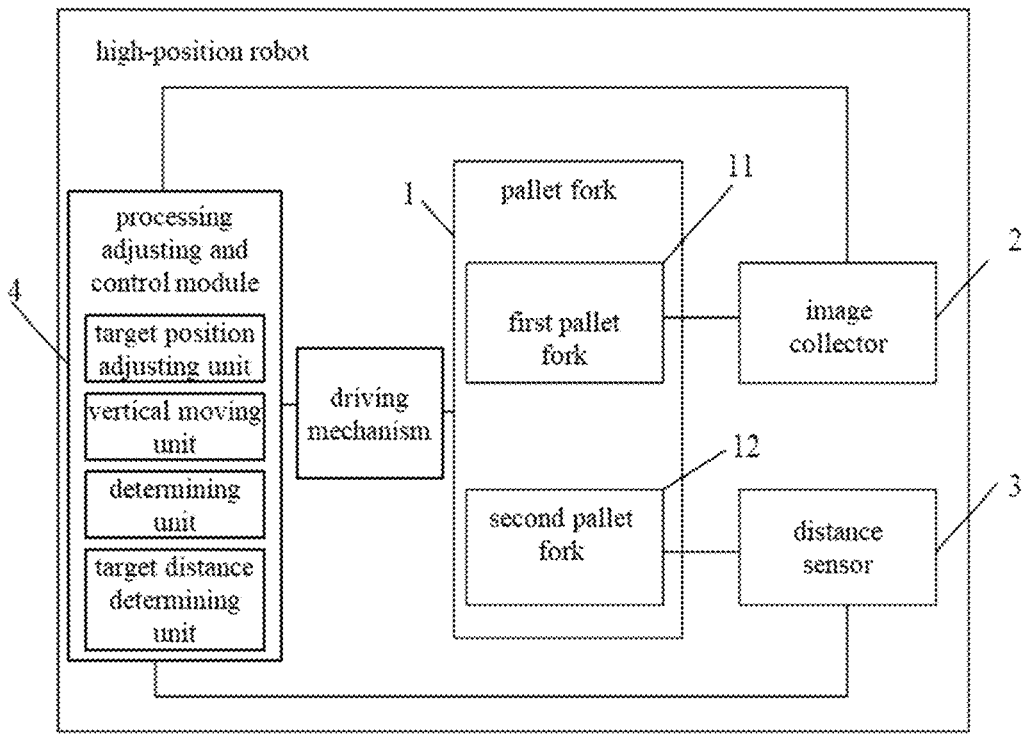

FIG. 5a

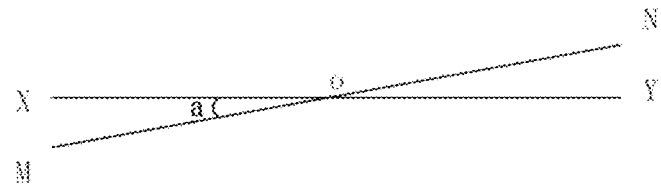

FIG. 5b adjusting and controlling a positional relationship between a pallet fork and a projection image of positioning information on a specified plane according to image data after the pallet fork lifts a storage container to be placed up to a same height as a target layer of a target stock container — S110 adjusting and controlling a distance between the pallet fork and the target stock container according to distance data — S120

FIG. 6

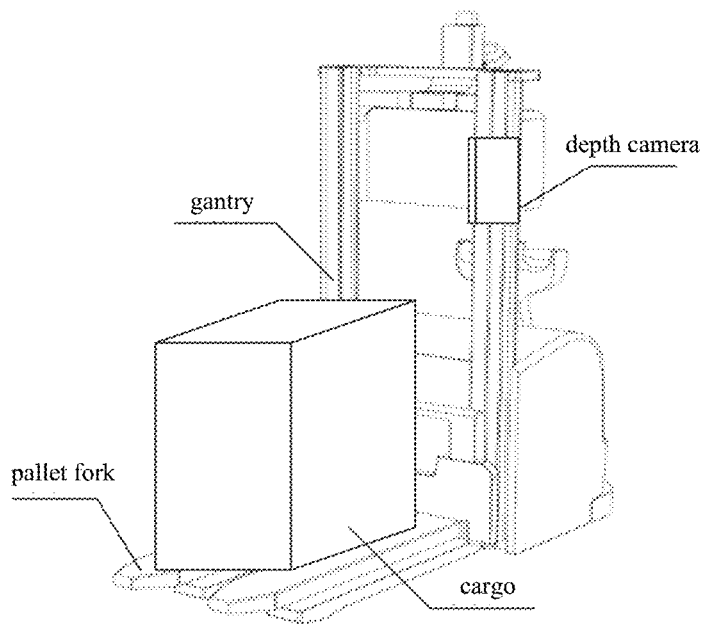

FIG. 13C

```
if determining that the high-position robot obtains a cargo and the picking-and-      S710
placing component is in a home state, controlling the depth camera to start
```

```
if there is a depth value less than a fixed depth value in the depth image, obtaining
highest point information of the cargo, wherein the fixed depth value is a vertical    S720
distance value from the depth camera to an outermost side of the picking-and-placing
component in the high-position robot
```

```
determining the height value and /or the depth value of the highest point of the cargo
according to the parameter information of the depth camera and the highest point      S730
information of the cargo
```

```
determining a driving strategy according to the height value and /or depth value of the   S740
cargo
```

FIG. 14A

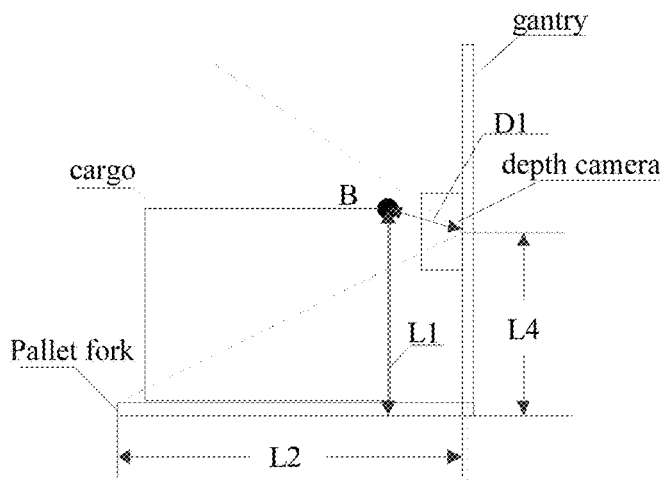

FIG. 14B

```
if determining that the high-position robot obtains a cargo and the picking-and-
placing component is in a home state, controlling the depth camera to start        S810
```

```
determining the depth value of the highest point of the cargo according to the
pixel coordinates of the highest point of the cargo in the depth image             S820
```

```
determining a horizontal included angle between the highest point of the cargo
and the depth camera according to the pixel coordinates of the highest point of    S830
the cargo in the depth image, and the vertical field angle and resolution in the
parameter information
```

```
determining the height value of the highest point of the cargo according to the
horizontal included angle, the depth value of the highest point of the cargo, and  S840
installation position information in the parameter information
```

```
determining a driving strategy according to the height value and/or depth value    S850
of the cargo
```

FIG. 15A

HIGH-POSITION ROBOT, METHOD FOR CALIBRATING RETURN OF STORAGE CONTAINER, AND STORAGE MEDIUM

CROSS-REFERENCE TO RELATED APPLICATIONS

The present application is a national phase entry under 35 U.S.C. § 371 of International Application PCT/CN2019/102910, filed Aug. 27, 2019, which claims the benefit of and priority to Chinese Patent Application No. 201910262867.7 filed Apr. 2, 2019, and to Chinese Patent Application No. 201910272981.8 filed Apr. 4, 2019, the entire contents of which are incorporated herein by reference.

FIELD

The embodiments of the present invention relate to the technical field of high-position robot devices, and in particular to a high-position robot, a method for calibrating a storage container, and a storage medium.

BACKGROUND

With the rapid development of the logistics industry in China, safe and efficient operation procedures have become necessary means for various logistics companies to enhance their market competitiveness. In many logistics warehouses, in order to save space, the height of storage racks is usually increased, and a corresponding storage and pick-up device is designed; and for large or heavy items, a high-position forklift has become a flexible, efficient and fast storage and pick-up tool in a logistics warehouse. Usually, after the high-position forklift picks up an item, a storage container (such as a pallet) holding the item must be returned by the forklift to a specified position of the corresponding storage container (e.g., a rack).

SUMMARY

According to a first aspect, an embodiment of the present invention provides a high-position robot, including a pallet fork, an image collector, a distance sensor, and a processing adjusting and control module, the processing adjusting and control module being separately connected with the pallet fork, the image collector and the distance sensor electrically. The pallet fork includes a first pallet fork and a second pallet fork which are configured to carry a storage container to be placed; the image collector is arranged on the first pallet fork and is configured to collect positioning information provided on a target stock container to obtain image data that can represent a positional relationship between the pallet fork and a projection image of the positioning information on a specified plane; the distance sensor is arranged on the second pallet fork and is configured to measure a distance between the pallet fork and the target stock container and obtain distance data; the processing adjusting and control module is configured to adjust and control the positional relationship between the pallet fork and the projection image of the positioning information on the specified plane according to the image data after the pallet fork lifts the storage container to be placed up to a same height as a target layer of the target stock container; and to adjust and control the distance between the pallet fork and the target stock container according to the distance data.

According to a second aspect, an embodiment of the present invention provides a method for calibrating a storage container, executed by a high-position robot, the high-position robot including a pallet fork, an image collector and a distance sensor being arranged on the pallet fork, the image collector being configured to collect positioning information provided on a target stock container to obtain image data that can represent a positional relationship between the pallet fork and a projection image of the positioning information on a specified plane, the distance sensor being configured to measure a distance between the pallet fork and the target stock container and obtain distance data, the method including: adjusting and controlling the positional relationship between the pallet fork and the projection image of the positioning information on the specified plane according to the image data after the pallet fork lifts a storage container to be placed up to a same height as a target layer of the target stock container; and adjusting and controlling the distance between the pallet fork and the target stock container according to the distance data.

According to a third aspect, an embodiment of the present invention further provides a method for calibrating a storage container, executed by a high-position robot, the high-position robot including a picking-and-placing component, a depth camera being provided on the picking-and-placing component, the method including: carrying a cargo and moving to a front of a multi-layer rack; according to parameter information of the depth camera and a depth image collected by the depth camera, lifting the cargo up to a position of a specified layer of the rack according to a preset rack height; according to the parameter information of the depth camera and the depth image collected by the depth camera, determining adjustment amounts and moving depths of the picking-and-placing component of the high-position robot in horizontal and vertical directions; and adjusting the picking-and-placing component and placing the cargo according to the adjustment amounts and the moving depths of the picking-and-placing component in the horizontal and vertical directions.

According to a fourth aspect, an embodiment of the present invention further provides a computer-readable storage medium having a computer program stored thereon, the computer program implementing the method for calibrating a storage container, executed by a high-position robot, the high-position robot including a pallet fork, an image collector and a distance sensor being arranged on the pallet fork, the image collector being configured to collect positioning information provided on a target stock container to obtain image data that can represent a positional relationship between the pallet fork and a projection image of the positioning information on a specified plane, the distance sensor being configured to measure a distance between the pallet fork and the target stock container and obtain distance data, the method including: adjusting and controlling the positional relationship between the pallet fork and the projection image of the positioning information on the specified plane according to the image data after the pallet fork lifts a storage container to be placed up to a same height as a target layer of the target stock container; and adjusting and controlling the distance between the pallet fork and the target stock container according to the distance data.

According to a fifth aspect, an embodiment of the present invention further provides a computer-readable storage medium having a computer program stored thereon, the computer program implementing the method for calibrating a storage container, executed by a high-position robot, the high-position robot including a picking-and-placing component, a depth camera being provided on the picking-and-placing component, the method including: carrying a cargo and moving to a front of a multi-layer rack; according to parameter information of the depth camera and a depth image collected by the depth camera, lifting the cargo up to a position of a specified layer of the rack according to a preset rack height; according to the parameter information of the depth camera and the depth image collected by the depth camera, determining adjustment amounts and moving depths of the picking-and-placing component of the high-position robot in horizontal and vertical directions; and adjusting the picking-and-placing component and placing the cargo according to the adjustment amounts and the moving depths of the picking-and-placing component in the horizontal and vertical directions.

BRIEF DESCRIPTION OF THE DRAWINGS

FIG. 5a is a schematic structural diagram of a high-position robot according to a third embodiment of the present invention;

FIG. 5b is a schematic diagram of calculating a lowest position when a storage container is tilted according to the third embodiment of the present invention;

FIG. 6 is a flowchart of a method for calibrating a storage container according to a fifth embodiment of the present invention;

FIG. 13C is a schematic diagram of a high-position robot with a cargo according to the first embodiment of the present invention when a picking-and-placing component is in a home position;

FIG. 14A is a flowchart of a method for determining a driving strategy according to the second embodiment of the present invention;

FIG. 14B is a simplified right view of a high-position robot with a cargo according to the second embodiment of the present invention;

FIG. 15A is a flowchart of a method for determining a driving strategy according to the third embodiment of the present invention;

DETAILED DESCRIPTION

At present, high-position forklifts on the market are divided into two types: manually-driven forklifts and unmanned forklifts. For a manually-driven forklift, a driver is required to operate and control it. For returning a storage container to a specified position of the storage container, the driver constantly adjusts a position and angle of a pallet fork by visual inspection of a position of the pallet fork relative to the storage container to complete the return of the storage container. However, the driver constantly adjusts the position and angle of the pallet fork, which results in complicated operations and poor positioning accuracy, thus lowering the efficiency of returning the storage container. For an unmanned forklift, the storage container is generally returned to a preset height. However, the on-site environment of a warehouse is complex, such as uneven floor or obstacles on the floor (i.e., falling items), which causes two wheels of the forklift to tilt, resulting in a high risk of failure in returning the storage container, damage to the storage container, or even a security incident due to falling of an item from high.

Figure 1:
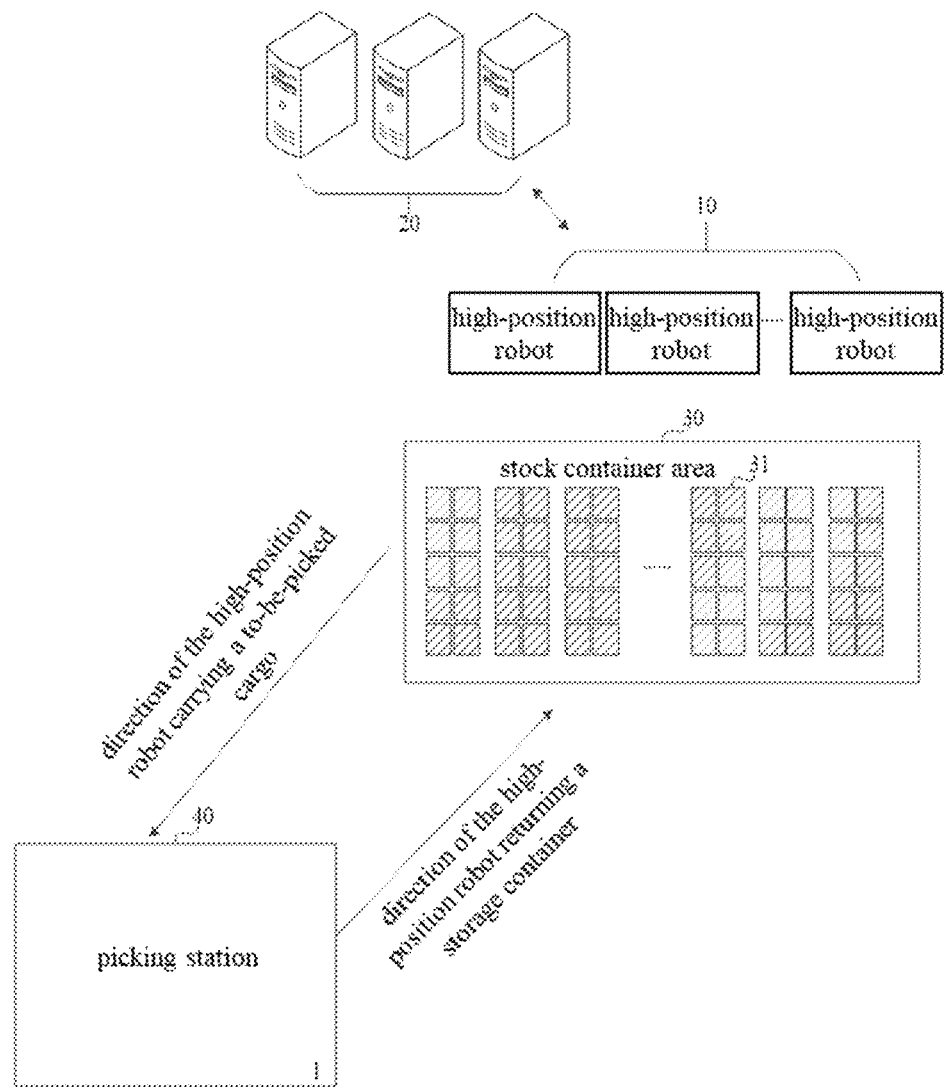
FIG. 1 is a schematic system structure diagram of a cargo picking system according to the present invention.
Figure 2:
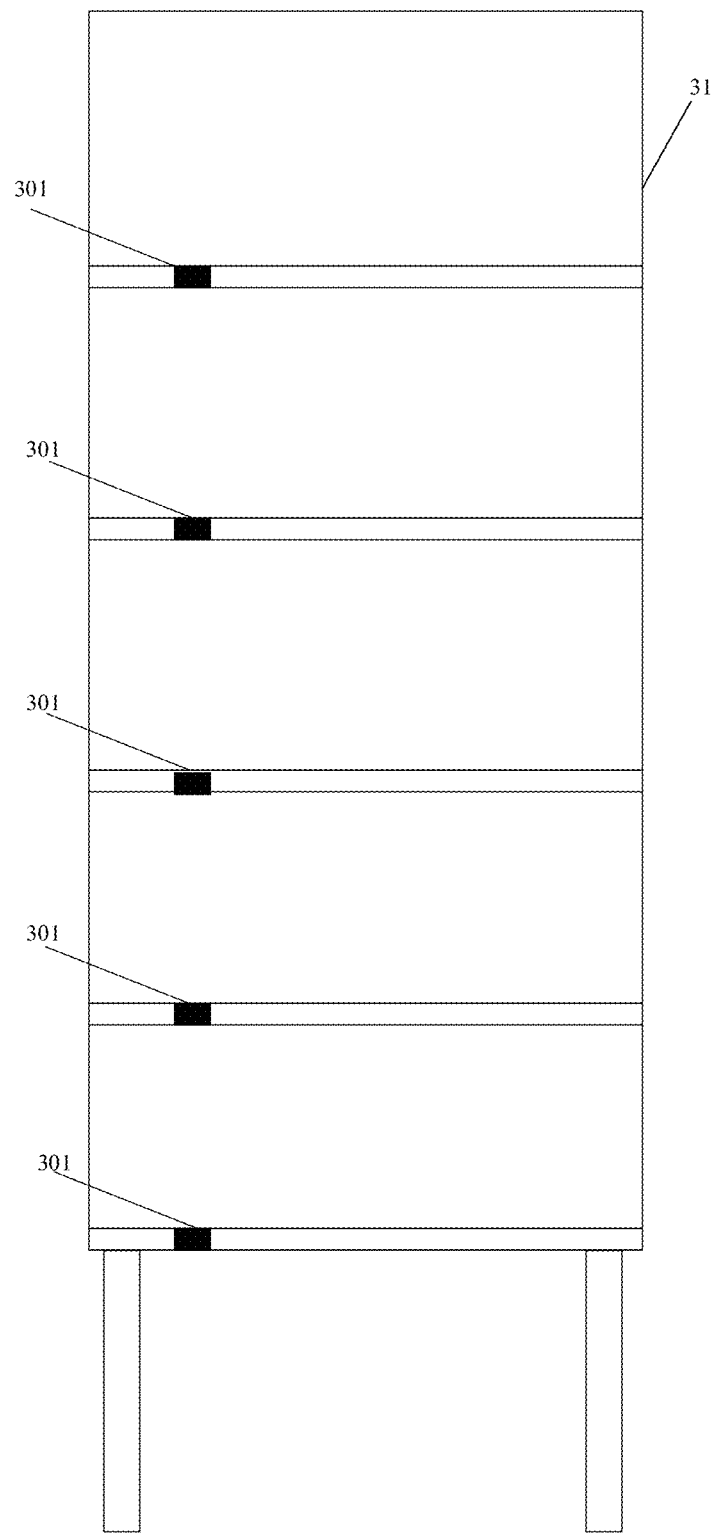
FIG. 2 is a schematic structural diagram of a high-position stock container according to the present invention.

Referring to FIG. 1, it shows a schematic system structure diagram of a cargo picking system. The cargo picking system includes: high-position robots 10, a control system 20, a stock container area 30, and a picking station 40. The stock container area 30 is provided with multiple stock containers 31. Various cargoes are placed on the stock containers 31. For example, similar to stock containers with various commodities found in supermarkets, the multiple stock containers 31 are arranged in a stock container array. As shown in FIG. 2, the stock container 31 serves as a high-position stock container, and each layer of the stock container is provided with positioning information 301.

Figure 11A:
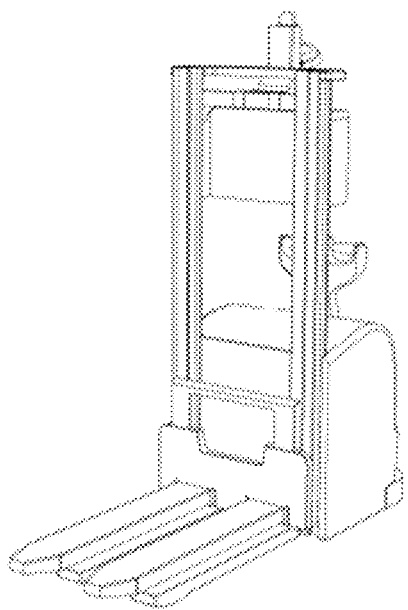
FIG. 11a and FIG. 11b are schematic structural diagrams of a high-position robot according to an embodiment of the present invention.
Figure 11B:
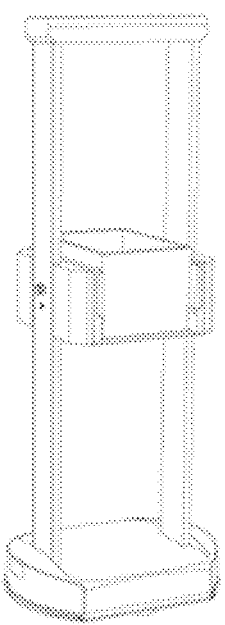

The high-position robot 10 is configured to transport containers or pallets. The high-position robot may include a high-position forklift as shown in FIG. 11a and a high-position container handling robot as shown in FIG. 11b. The high-position forklift takes the pallets or containers by a pallet fork, and the pallet fork can be raised and lowered. The high-position container handling robot includes a mobile base, a lifting bracket, a telescopic assembly and a deflector finger. The telescopic assembly may be pallet-shaped, and the deflector finger is installed at an end of the telescopic assembly away from the lifting bracket and can stretch out and retract. One end of the telescopic assembly is connected with the lifting bracket, and the other end of the telescopic assembly is connected with the deflector finger. Under the action of the telescopic assembly, the deflector finger can pass through a bottom of the container to abut against a back of the container, and drag the container in and out of the lifting bracket.

A component of the high-position robot 10 for picking and placing cargoes or the storage containers is called picking-and-placing component. For the high-position forklift, the pallet fork serves as the picking-and-placing component. For the high-position container handling robot, the telescopic assembly and the deflector finger serve as the picking-and-placing component. The control system 20 conducts wireless communication with the high-position robot 10. Under the control of the control system 20, the high-position robot 10 returns the storage container holding cargoes to a position of a corresponding stock container after transporting the cargoes to the picking station 40. For example, when returning the storage container, the high-position robot 10 carries the to-be-returned storage container and moves to the stock container 31, lifts the picking-and-placing component up to a same height as a specified layer, and adjusts the picking-and-placing component by scanning the positioning information 301 of this layer to complete return of the storage container.

The storage containers refer to containers for holding cargoes during handling, such as pallets, bins or the like, and the stock containers refer to racks for holding cargoes or the storage containers in the stock area, such as pallet racks or high-position racks.

The present invention will be further described in detail below with reference to the drawings and embodiments. It should be understood that the specific embodiments described here are only for explaining the present invention rather than limiting it. In addition, it should also be noted that, for ease of description, the drawings only show parts related to the present invention instead of all the structures.

The embodiments of the present application will be described below by an example where the high-position robot 10 serves as a high-position forklift.

The embodiments of the present invention provide a high-position robot, a method for calibrating a storage container, and a storage medium. A position of a pallet fork relative to the storage container is automatically adjusted by a high-position unmanned forklift to achieve safely and accurately returning the storage container to a specified position of a stock container, and the efficiency of returning the storage container is improved.

First Embodiment

Figure 3:
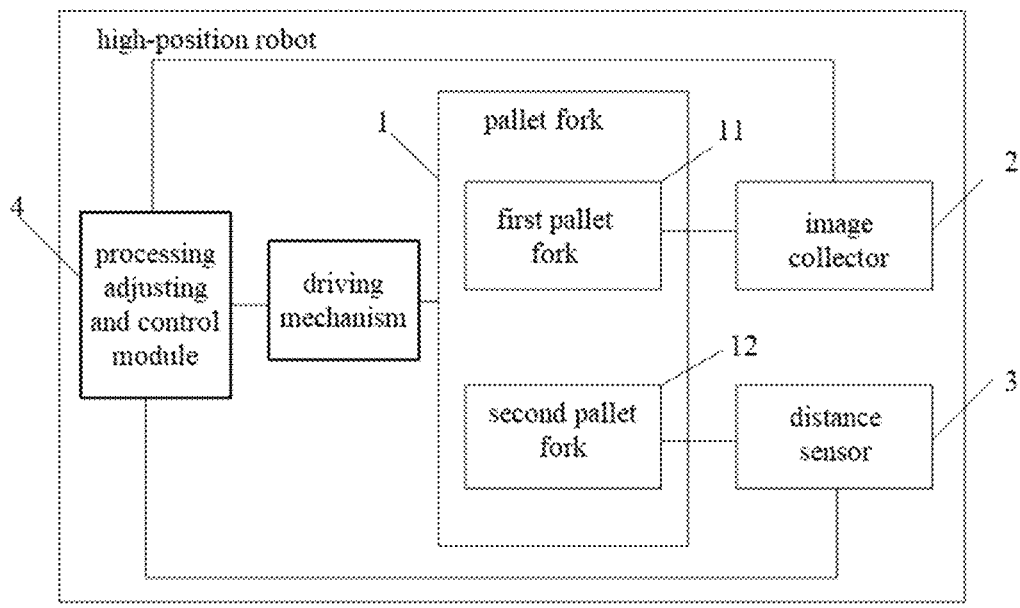
FIG. 3 is a schematic structural diagram of a high-position robot according to a first embodiment of the present invention.

FIG. 3 is a schematic structural diagram of a high-position forklift according to a first embodiment of the present invention, including a pallet fork 1, an image collector 2, a distance sensor 3, and a processing adjusting and control module 4, wherein the processing adjusting and control module 4 is separately connected to the pallet fork 1, the image collector 2 and the distance sensor 3 electrically; further, the processing adjusting and control module 4 is connected to the pallet fork 1 through a driving mechanism and controls the pallet fork 1 to move through the driving mechanism; the driving mechanism includes a driving motor, gears and other components. It should be noted here that the driving mechanism of the high-position forklift in other embodiments of the present invention (e.g., in FIG. 4 and FIG. 5a) has a same composition and function as the driving mechanism in this embodiment.

The pallet fork 1 includes a first pallet fork 11 and a second pallet fork 12 which are configured to carry a storage container to be placed;

the image collector 2 is arranged on the first pallet fork 11, preferably at a front end of the first pallet fork 11 and is configured to collect positioning information provided on a target stock container to obtain image data that can represent a positional relationship between the pallet fork and a projection image of the positioning information on a specified plane;

the distance sensor 3 is arranged on the second pallet fork 12, preferably at a front end of the second pallet fork 12 and is configured to measure a distance between the pallet fork and the target stock container and obtain distance data;

the processing adjusting and control module 4 is configured to adjust and control the positional relationship between the pallet fork and the projection image of the positioning information on the specified plane according to the image data after the pallet fork lifts the storage container to be placed up to a same height as a target layer of the target stock container; and to adjust and control the distance between the pallet fork and the target stock container according to the distance data.

The storage container (e.g., a pallet) that holds an item needs to be placed on a corresponding stock container layer where the item is picked up after the high-position forklift has finished picking up the items; it means that a return position corresponding to each storage container to be placed is fixed on the stock container. Therefore, during the return of the storage container, the processing adjusting and control module first controls the pallet fork to lift the storage container to be placed up to the same height as the target layer of the target stock container. The target stock container is configured as a multi-layer high-position stock container, and a height difference between two adjacent layers of stock containers is the same, for example, 1 meter. Each layer of the stock container is provided with positioning information, and a position of the positioning information of each layer is fixed. The fixed position includes a position on the target layer of the target stock container that is theoretically right opposite to the image collector arranged on the pallet fork after the pallet fork lifts the storage container up to the same height as the target layer of the target stock container. The positioning information here is, for example, a QR code, such as a DM code.

After the processing adjusting and control module 4 controls the pallet fork to lift the storage container up to the same height as the target layer of the target stock container, the image collector arranged at the front end of the pallet fork collects the positioning information pasted on the target layer of the target stock container in real time, and then the image data that can represent the positional relationship between the pallet fork and the projection image of the positioning information on the specified plane can be obtained, wherein the specified plane may be, for example, a plane between the pallet fork and the positioning information and perpendicular to the pallet fork. The position of the pallet fork is adjusted according to the obtained image data, so that the storage container carried by the pallet fork can be placed on the target layer of the target stock container just by moving the adjusted pallet fork horizontally.

Further, adjusting and controlling the distance between the pallet fork and the target stock container, that is, shortening the distance between the pallet fork and the target stock container, can be achieved by moving the pallet fork horizontally. And the purpose of returning the storage container can be reached when a distance of the horizontal movement of the pallet fork is greater than the distance data collected by the distance sensor. Further, in order to ensure the stability of the placed storage container and the accuracy of the moving distance of the pallet fork, during the process of adjusting and controlling the distance between the pallet fork and the target stock container, in addition to the distance data collected by the distance sensor, an attribute of the storage container also needs to be considered. The attribute of the storage container includes information such as a length, width, and height of the storage container. In this embodiment, the attribute of the storage container refers to the width of the storage container. In an embodiment, the processing adjusting and control module 4 sums the distance between the front end of the pallet fork and the target stock container collected by the distance sensor and a width of the storage container, and the obtained sum value is regarded a horizontal distance that the pallet fork needs to move towards the target stock container when placing the storage container. In this way, the pallet fork after position adjustment can be controlled by the processing adjusting and control module 4 to move the calculated horizontal distance towards the target stock container to ensure that the storage container reaches the target layer of the target stock container, that is, the return and placement of the storage container is completed.

The high-position forklift according to this embodiment controls the pallet fork to lift the storage container up to the same height as the specified position of the target stock container, and then automatically adjusts the position of the pallet fork relative to the target stock container according to the positioning information collected in real time by the image collector, and in the meanwhile calculates the horizontal distance required to return the storage container based on the attribute of the storage container and the distance between the pallet fork and the target stock container collected by the distance sensor, so as to achieve the purpose of accurately returning the storage container to the specified position of the stock container. In this way, the efficiency of returning the storage container is improved.

In other embodiments of the present application, when the high-position robot 10 serves as a high-position container handling robot, the image collector 2 and the distance sensor 3 may be respectively installed on front ends on left and right sides of the telescopic assembly of the high-position container handling robot. In this way, the high-position container handling robot collects the positioning information provided on the target stock container by means of the image collector 2 to obtain image data that can represent a positional relationship between the telescopic assembly and a projection image of the positioning information on a specified plane and measures a distance between the telescopic assembly and the target stock container by means of the distance sensor 3 to obtain distance data.

Second Embodiment

Figure 4:
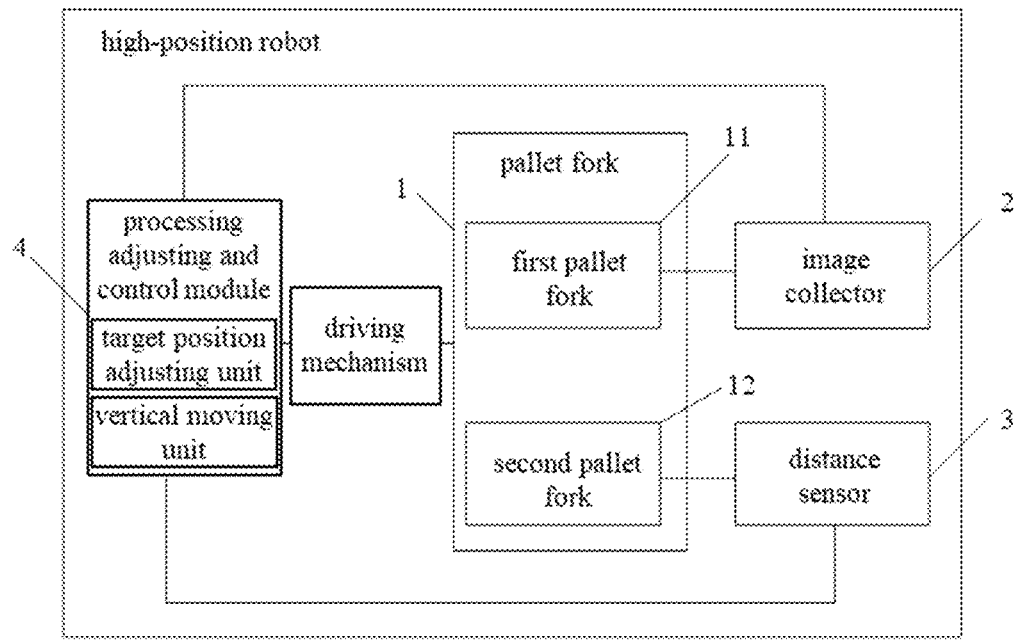
FIG. 4 is a schematic structural diagram of a high-position robot according to a second embodiment of the present invention.

FIG. 4 is a schematic structural diagram of a high-position forklift according to this embodiment. This embodiment is optimized on the basis of the above-mentioned embodiment, and the processing adjusting and control module 4 includes:

a target position adjusting unit configured to control the pallet fork to move left and right or up and down to a target position according to a position of the collected positioning information in an image taken by the image collector, wherein at the target position, the projection image corresponding to the positioning information is located in a preset standard position in the image taken by the image collector.

The preset standard position here is, for example, a center of the image taken by the image collector. For the reason of the flatness of the floor, the control accuracy of the high-position forklift itself or the like, when the pallet fork lifts the storage container up to the same height as the target layer of the target stock container, the positioning information collected by the image collector at the front end of the pallet fork is not in the center of the image taken by the image collector, that is, the pallet fork is not aligned with the positioning information.

Therefore, it is required to calibrate the position of the pallet fork to the target position. As a calibration method, calibration can be performed by monitoring the position of the positioning information in real time during the process of adjusting the pallet fork. As an example, if the projection image corresponding to the collected positioning information is at a left position in the image taken by the image collector, the pallet fork is moved to the left and in the meanwhile the positioning information is collected in real time, and the movement of the pallet fork is stopped until the collected positioning information is in the center of the image taken by the image collector and in this case, the position of the pallet fork is the target position. As another calibration method, a pixel value can be calibrated through the distance between the front end of the pallet fork and the target stock container detected by the distance sensor and a size of the positioning information taken by the image collector, and then a distance deviation of the positioning information relative to the center of the image taken by the image collector is calculated according to the calibrated pixel value, and it is determined to directly move the pallet fork to the target position according to the distance deviation.

The processing adjusting and control unit 4 further includes: a vertical moving unit configured to control the pallet fork to move vertically upwards from the target position by a preset distance, to extend the storage container carried by the pallet fork into storage space of the target stock container without hindrance, wherein the preset distance is determined according to a height of the positioning information and a height of a bottom face of the target layer of the target stock container.

After the pallet fork is adjusted to the target position, in order to ensure that the pallet fork can return the storage container normally, it is also required that a bottom face of the storage container is higher than the bottom face of the target layer of the target stock container, and a height difference between the bottom face of the storage container and the bottom face of the target layer of the target stock container is less than a preset threshold. The bottom face of the target layer of the target stock container in the embodiments of the present invention always refers to an upper bottom face of the target layer. Therefore, the vertical moving unit needs to control the pallet fork to move vertically upwards from the target position by a preset distance, where the preset distance is determined according to the height of the positioning information and a height of the bottom face of the target layer of the target stock container. As an example, the preset distance is in an interval (A, B), where A refers to a height difference between the positioning information and the bottom face of the target layer of the target stock container, and B refers to a sum of A and a preset threshold, and the preset threshold here refers to a maximum allowable movement error.

After the high-position forklift according to this embodiment collects the positioning information, the pallet fork is calibrated to the target position by moving the pallet fork left and right or up and down according to the position of the projection image corresponding to the positioning information in the image taken by the image collector; and then the pallet fork is moved vertically upwards by a certain distance to achieve accurate positioning for the pallet fork and ensure the accuracy of returning the storage container by the pallet fork; in this way, the efficiency of returning the storage container is improved.

Third Embodiment

FIG. 5a is a schematic structural diagram of a high-position forklift according to this embodiment. This embodiment is optimized on the basis of the above-mentioned embodiment, and the processing adjusting and control module 4 includes:

a determining unit configured to determine whether an angle deviation of the collected positioning information in a horizontal direction is greater than a preset angle threshold according to the position of the collected positioning information in the image taken by the image collector before the vertical moving unit moves the pallet fork vertically upwards from the target position by a preset distance.

For the reason of the flatness of the floor of a warehouse, the pallet fork will have a certain tilt, so it is required to determine whether the current tilt of the pallet fork will affect the return of the storage container. In some embodiments, it can be determined by determining whether the angle deviation of the collected positioning information in the horizontal direction is greater than the preset angle threshold.

The processing adjusting and control unit 4 further includes a target distance determining unit configured to: determine a height of a lowest position of the storage container according to the angle deviation and an attribute of the storage container when the determining unit determines that the angle deviation of the collected positioning information in the horizontal direction is greater than the preset angle threshold; and then calculate a target distance based on the height of the lowest position of the storage container and the height of the bottom face of the target layer of the target stock container; and control the pallet fork to move vertically upwards from the target position by the target distance; wherein the attribute of the storage container includes a length of the storage container.

In this embodiment, the attribute of the storage container refers to the length of the storage container. Due to the tilt of the pallet fork, the lowest position of the storage container will inevitably be lower than a horizontal plane where the target position is located, and a distance between the lowest position of the storage container and the horizontal plane where the target position is located can be determined by a trigonometric function, thus determining the height of the lowest position of the storage container. As an example, as shown in FIG. 5b, the tilted storage container is denoted as MN, the storage container in the horizontal direction of the target position is denoted as XY, the angle deviation is denoted as a, the length of the storage container is determined as d, and the center point is denoted as o; it is determined by a triangle relationship that the distance between the lowest position M of the storage container MN and the horizontal plane where the target position is located is calculated as $\tan(a)*d/2$. Since the horizontal height of the target position is known, and based on this, the target distance determining unit can determine the height of the lowest position M of the storage container MN.

The target distance is then determined according to the height of the lowest position of the storage container and the height of the bottom face of the target layer of the target stock container. The target distance determining unit controls the pallet fork to move vertically upwards from the target position by the target distance, wherein the target distance is greater than a height difference between the lowest position of the storage container and the bottom face of the target layer of the target stock container; and after the pallet fork moves by the target distance, the height difference between the lowest position of the storage container and the bottom face of the target layer of the target stock container is less than a preset threshold.

Correspondingly, the vertical moving unit is further configured to move the pallet fork vertically upwards from the target position by the preset distance when the determining unit determines that the angle deviation of the collected positioning information in the horizontal direction is not greater than the preset angle threshold.

After adjusting the pallet fork to a position facing the positioning information, the high-position forklift according to this embodiment determines whether the angle deviation of the positioning information in the horizontal direction is greater than the preset angle threshold, and if so, the target distance that the pallet fork needs to be moved vertically upwards is recalculated according to the angle deviation to achieve further accurate positioning of the pallet fork and ensure that the storage container is accurately returned when the fork is tilted, thus improving the efficiency of returning the storage container.

Fourth Embodiment

This embodiment is optimized on the basis of the above-mentioned embodiment, and the processing adjusting and control module 4 is further configured to:

instruct the high-position forklift to carry the storage container and move to a preset position, wherein the preset position is located right in front of the target stock container and a distance from the preset position to the target stock container is within a pre-configured distance interval.

In this embodiment, before returning the storage container, the high-position forklift carries the storage container and moves to a preset position, wherein the preset position is located right in front of the target stock container and a distance from the preset position to the target stock container is within a pre-configured distance interval. As an example, the preset position is within an area of 20 cm to 30 cm in front of the target stock container.

In some embodiments, a laser radar is installed on a top of the high-position forklift. Before the high-position forklift performs a task of returning the storage container, the high-position forklift can be controlled to run a round in the warehouse in advance, and a high-precision map of the warehouse can be built based on point cloud data collected by the laser radar. When the high-position forklift performs the task of returning the storage container, the processing adjusting and control unit builds a real-time global map of surroundings of the high-position forklift according to the point cloud data collected by the laser radar based on a laser slam technology, and compares the built real-time global map with the pre-built high-precision map, thereby controlling the high-position forklift to automatically navigate to the preset position.

In addition, after a returning module returns the storage container, the processing adjusting and control module is further configured to exit the pallet fork and control the pallet fork to be lowered to an initial position, so that the high-position forklift receives a new instruction and continues to perform a corresponding operation.

Before returning the storage container, the high-position forklift according to this embodiment carries the storage container and moves to a preset position, which provides a position guarantee for accurately returning the storage container. In the meanwhile, after the return task is completed, the pallet fork returns to the initial position so that the high-position forklift continues to perform other tasks. In this way, the operation efficiency of the high-position forklift can be improved.

Fifth Embodiment

FIG. 6 is a flowchart of a method for calibrating a storage container according to a fifth embodiment of the present invention. This embodiment is applicable to the situation where a high-position robot returns the storage container holding an item after picking up the item. The method is executed by the high-position robot according to the above-mentioned embodiment. The high-position robot includes a pallet fork, and an image collector and a distance sensor are arranged on the pallet fork. The image collector is configured to collect positioning information provided on a target stock container to obtain image data that can represent a positional relationship between the pallet fork and a projection image of the positioning information on a specified plane. The distance sensor is configured to measure a distance between the pallet fork and the target stock container and obtain distance data. As shown in FIG. 6, the method for calibrating a storage container according to the embodiment of the present invention may include the following steps.

In step S110, a positional relationship between a pallet fork and a projection image of positioning information on a specified plane is adjusted and controlled according to image data after the pallet fork lifts a storage container to be placed up to a same height as a target layer of a target stock container.

In step S120, a distance between the pallet fork and the target stock container is adjusted and controlled according to distance data.

Adjusting and controlling the distance between the pallet fork and the target stock container means shortening the distance between the pallet fork and the target stock container, so as to reach the purpose of return the storage container. During the process of adjusting the distance between the pallet fork and the target stock container, an attribute of the storage container also need to be considered. A horizontal distance that the pallet fork needs to move towards the target stock container when returning the storage container can be determined based on the attribute of the storage container and the distance between the pallet fork and the target stock container collected by a distance sensor. After position adjustment, the pallet fork is moved towards the target stock container by the horizontal distance, so as to return the storage container.

The method for calibrating a storage container according to this embodiment is executed by a corresponding high-position robot, and the execution principle has been detailed in the above-mentioned embodiment and will not be repeated here.

In this embodiment, after the pallet fork lifts the storage container up to the same height as the specified position of the target stock container, the position of the pallet fork relative to the target stock container is automatically adjusted according to the positioning information collected in real time by the image collector, and in the meanwhile the horizontal distance required to return the storage container is calculated based on the attribute of the storage container and the distance between the pallet fork and the target stock container collected by the distance sensor, thus achieving the purpose of accurately returning the storage container to the specified position of the stock container. In this way, the efficiency of returning the storage container is improved.

In an embodiment of the present invention, a depth camera can be configured to complete the method for calibrating a storage container. The depth camera can be installed on a picking-and-placing component of the high-position robot, for example, installed on a certain pallet fork of a high-position forklift or installed on a telescopic assembly of a high-position container handling robot. The method for calibrating a storage container by configuring a depth camera for a high-position robot includes steps S1 to S4.

In step S1, the high-position robot carries a cargo and moves to the front of a multi-layer rack.

In step S2, according to parameter information of the depth camera and a depth image collected by the depth camera, the high-position robot lifts the cargo up to a position of a specified layer of the rack according to a preset rack height.

The depth camera on the picking-and-placing component of the high-position robot can capture positioning information of the rack, and the cargoes can be lifted up to the position of a specified layer of the rack according to the positioning information.

An RGB image captured by the depth camera can be used to capture the positioning information. By calculation based on the captured positioning information, position and angle changes of the picking-and-placing component of the high-position robot in an X-Y direction relative to a rack positioning graph can be obtained. An adjustment amount of the picking-and-placing component in the X-Y direction can be calculated. Adjustment in an X direction can ensure the safety of sides of the rack or a work position adjacent to a target work position. Adjustment in a Y direction can ensure the safety of a bottom side of the rack.

In step S3, according to the parameter information of the depth camera and the depth image collected by the depth camera, the high-position robot determines adjustment amounts and moving depths of the picking-and-placing component of the high-position robot in horizontal and vertical directions.

According to the parameter information of the depth camera and the depth image collected by the depth camera, coordinates (x, y) of the center of the positioning information are obtained, and a depth value of the point is extracted at a position (x, y) in a corresponding depth map. It is the distance d1 between the center of the depth camera and the rack in a Z-axis direction. According to a relative position distance d2 between the center of the depth camera and a foremost end of the picking-and-placing component of the high-position robot, a moving distance of the picking-and-placing component of the high-position robot in the Z-axis direction is calculated as d3=d1−d2.

In step S4, the high-position robot adjusts the picking-and-placing component and places the cargo according to the adjustment amounts of the picking-and-placing component in the horizontal and vertical directions and the moving depth.

In the process of placing the cargo, the high-position robot can first lift the cargoes up through the picking-and-placing component, so that a lowest point of the picking-and-placing component is higher than a plane of the rack; and then the picking-and-placing component is moved along a forward direction of the Y axis by the distance d3. The cargo is then placed and the picking-and-placing component is exited.

Finally, the picking-and-placing component can descend so that the picking-and-placing component returns.

In the embodiments of the present invention, the positioning information may be a QR code image or other information for reference. For example, in one embodiment of the present invention, the depth camera is configured to take an image of the rack. The image includes the bottom and left and right sides of the rack and a depth value of the image. A middle position among the left and right sides and the bottom side of the image can be calculated and found according to a preset image coordinate system, and the middle position serves as a horizontal position for placing the cargo, i.e., a position in an XY plane. The embodiments of the present invention can realize the method for calibrating a storage container just by using the depth camera, which is simple, fast and accurate, and greatly improves the convenience of the method for calibrating a storage container.

Embodiment 6

Figure 7:
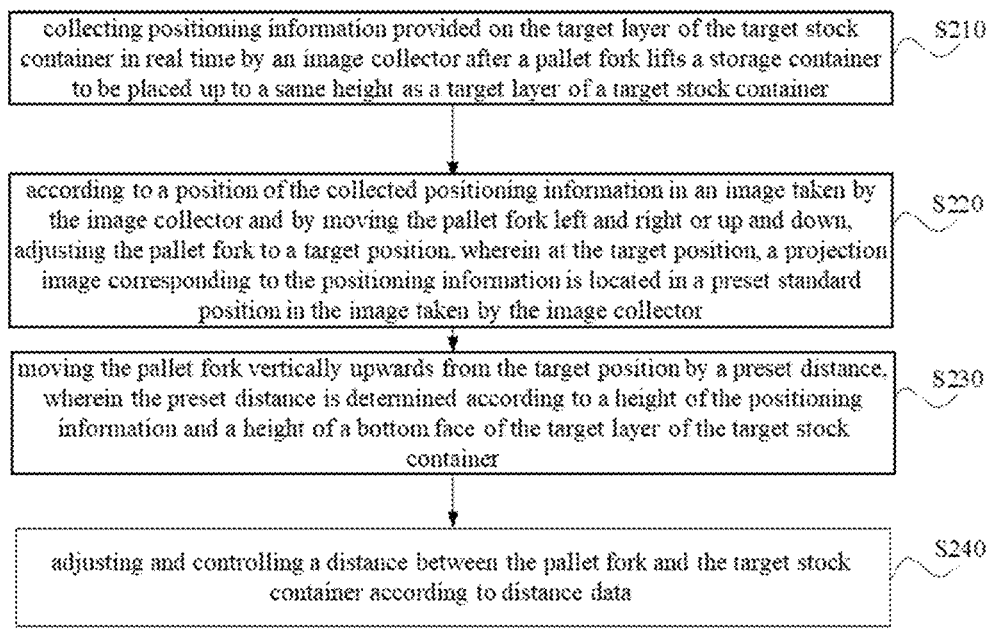
FIG. 7 is a flowchart of a method for calibrating a storage container according to a sixth embodiment of the present invention.

FIG. 7 is a flowchart of a method for calibrating a storage container according to a sixth embodiment of the present invention. This embodiment is optimized on the basis of the above-mentioned embodiment. As shown in FIG. 7, the method for calibrating a storage container according to the embodiment of the present invention may include the following steps.

In step S210, after a pallet fork lifts a storage container to be placed up to a same height as a target layer of a target stock container, positioning information provided on the target layer of the target stock container is collected in real time by an image collector.

In step S220, according to a position of the collected positioning information in an image taken by the image collector and by moving the pallet fork left and right or up and down, the pallet fork is adjusted to a target position, wherein at the target position, a projection image corresponding to the positioning information is located in a preset standard position in the image taken by the image collector.

In step S230, the pallet fork is moved vertically upwards from the target position by a preset distance, wherein the preset distance is determined according to a height of the positioning information and a height of a bottom face of the target layer of the target stock container.

In step S240, a distance between the pallet fork and the target stock container is adjusted and controlled according to distance data.

The method for calibrating a storage container according to this embodiment is executed by a corresponding high-position robot, and the execution principle has been detailed in the above-mentioned embodiment and will not be repeated here.

In this embodiment, after the positioning information is collected, the pallet fork is calibrated to the target position by moving the pallet fork left and right or up and down according to the position of the projection image corresponding to the positioning information in the image taken by the image collector; and then the pallet fork is moved vertically upwards by a certain distance to achieve accurate positioning for the pallet fork and ensure the accuracy of returning the storage container by the pallet fork; in this way, the efficiency of returning the storage container is improved.

Seventh Embodiment

Figure 8:
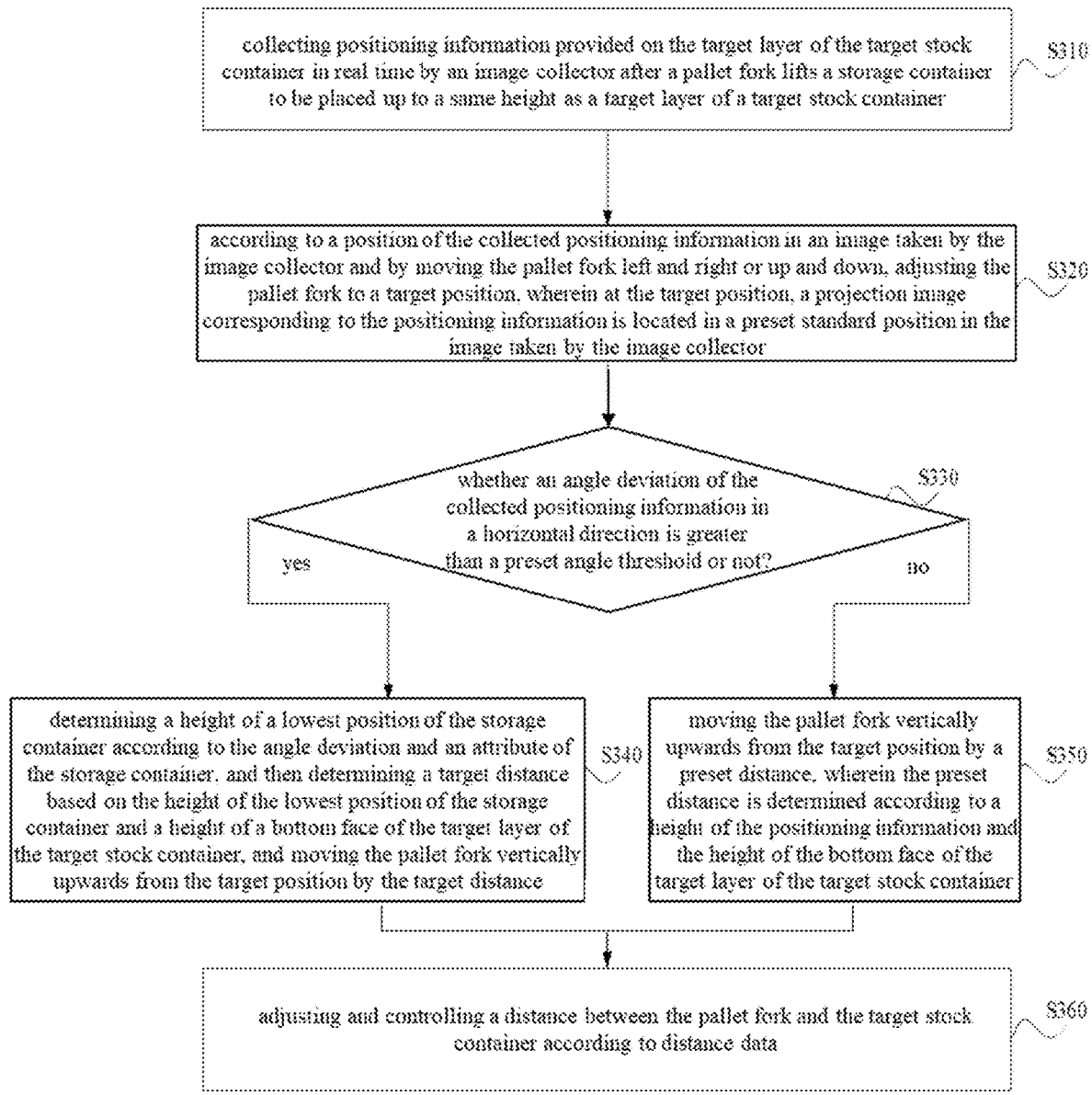
FIG. 8 is a flowchart of a method for calibrating a storage container according to a seventh embodiment of the present invention.

FIG. 8 is a flowchart of a method for calibrating a storage container according to a seventh embodiment of the present invention. This embodiment is optimized on the basis of the above-mentioned embodiment. As shown in FIG. 8, the method for calibrating a storage container according to the embodiment of the present invention may include the following steps.

In step S310, positioning information provided on the target layer of the target stock container is collected in real time by an image collector after a pallet fork lifts a storage container to be placed up to a same height as a target layer of a target stock container.

In step S320, according to a position of the collected positioning information in an image taken by the image collector and by moving the pallet fork left and right or up and down, the pallet fork is adjusted to a target position, wherein at the target position, a projection image corresponding to the positioning information is located in a preset standard position in the image taken by the image collector.

In step S330, it can be determined whether an angle deviation of the collected positioning information in a horizontal direction is greater than a preset angle threshold; if so, step S340 will be executed; or otherwise, step 350 will be executed.

In step S340, a height of a lowest position of the storage container is determined according to the angle deviation and an attribute of the storage container; and then a target distance is determined based on the height of the lowest position of the storage container and a height of a bottom face of the target layer of the target stock container, and the pallet fork is moved vertically upwards from the target position by the target distance.

In step S350, the pallet fork is moved vertically upwards from the target position by a preset distance, wherein the preset distance is determined according to a height of the positioning information and the height of the bottom face of the target layer of the target stock container.

In step S360, a distance between the pallet fork and the target stock container is adjusted and controlled according to distance data.

The method for calibrating a storage container according to this embodiment is executed by a corresponding high-position robot, and the execution principle has been detailed in the above-mentioned embodiment and will not be repeated here.

In this embodiment, after the pallet fork is adjusted to a position facing the positioning information, it is determined whether the angle deviation of the positioning information in the horizontal direction is greater than the preset angle threshold, and if so, the target distance that the pallet fork needs to be moved vertically upwards is recalculated according to the angle deviation to achieve further accurate positioning of the pallet fork and ensure that the storage con-

Eighth Embodiment

Figure 9:
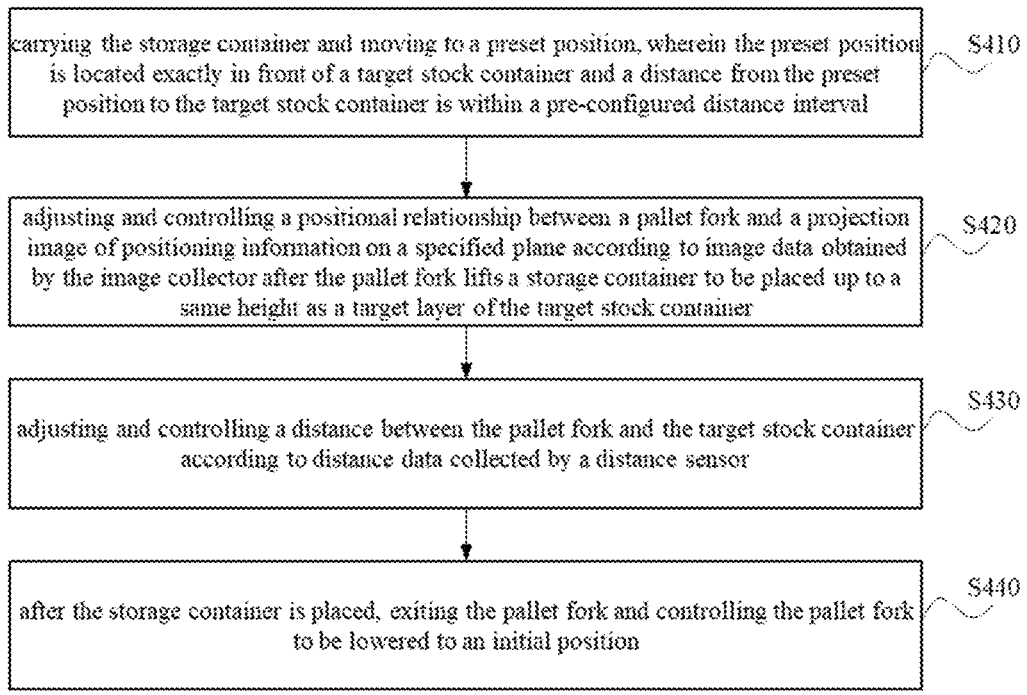
FIG. 9 is a flowchart of a method for calibrating a storage container according to an eighth embodiment of the present invention.

FIG. 9 is a flowchart of a method for calibrating a storage container according to an eighth embodiment of the present invention. This embodiment is optimized on the basis of the above-mentioned embodiment. As shown in FIG. 9, the method for calibrating a storage container according to the embodiment of the present invention may include the following steps.

In step S410, the storage container is carried and moved to a preset position, wherein the preset position is located right in front of a target stock container and a distance from the preset position to the target stock container is within a pre-configured distance interval.

In step S420, a positional relationship between a pallet fork and a projection image of positioning information on a specified plane is adjusted and controlled according to image data obtained by the image collector after the pallet fork lifts a storage container to be placed up to a same height as a target layer of the target stock container.

In step S430, a distance between the pallet fork and the target stock container is adjusted and controlled according to distance data collected by a distance sensor.

In step S440, after the storage container is placed, the pallet fork is exited and controlled to be lowered to an initial position.

The method for calibrating a storage container according to this embodiment is executed by a corresponding high-position robot, and the execution principle has been detailed in the above-mentioned embodiment and will not be repeated here.

In this embodiment, before returning the storage container, the high-position robot carries the storage container and moves to a preset position, which provides a position guarantee for accurately returning the storage container. In the meanwhile, after the return task is completed, the pallet fork returns to the initial position so that the high-position robot continues to perform other tasks. In this way, the operation efficiency of the high-position robot can be improved.

Ninth Embodiment

Figure 10:
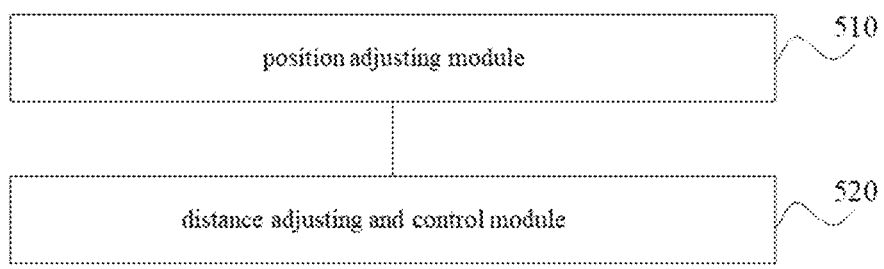
FIG. 10 is a schematic structural diagram of a calibration device for returning a storage container according to a ninth embodiment of the present invention.

A calibration device for returning a storage container according to a ninth embodiment of the present invention is configured on a processing adjusting and control module of a high-position robot. The high-position robot includes a pallet fork, and an image collector and a distance sensor are respectively arranged on two front ends of the pallet fork. The image collector is configured to collect positioning information provided on a target stock container to obtain image data that can represent a positional relationship between the pallet fork and a projection image of the positioning information on a specified plane. The distance sensor is configured to measure a distance between the pallet fork and the target stock container and obtain distance data. As shown in FIG. 10, it shows a schematic structural diagram of a calibration device for returning a storage container, and the device includes:

a position adjusting module 510 configured to adjust and control the positional relationship between the pallet fork and the projection image of the positioning information on the specified plane according to the image data after the pallet fork lifts a storage container to be placed up to a same height as a target layer of the target stock container; and a distance adjusting and control module 520 configured to adjust and control the distance between the pallet fork and the target stock container according to the distance data.

In this embodiment, after the pallet fork lifts the storage container up to a same height as a specified position of the target stock container, a collecting and adjusting module automatically adjusts a position of the pallet fork relative to the target stock container according to the positioning information collected in real time by the image collector, and in the meanwhile adjusts and controls the distance between the pallet fork and the target stock container according to the distance data collected by the distance sensor, thus achieving the purpose of accurately returning the storage container to the specified position of the stock container. In this way, the efficiency of returning the storage container is improved.

On the basis of the foregoing embodiments, the position adjusting module includes:

a target position adjusting unit configured to adjust the pallet fork to a target position by moving the pallet fork left and right or up and down according to a position of the collected positioning information in an image taken by the image collector, wherein at the target position, the projection image corresponding to the positioning information is located in a preset standard position in the image taken by the image collector; and a vertical moving unit configured to move the pallet fork vertically upwards from the target position by a preset distance, to extend the storage container carried by the pallet fork into storage space of the target stock container without hindrance, wherein the preset distance is determined according to a height of the positioning information and a height of a bottom face of the target layer of the target stock container.

On the basis of the foregoing embodiments, the position adjusting module further includes:

a determining unit configured to determine whether an angle deviation of the collected positioning information in a horizontal direction is greater than a preset angle threshold according to the position of the collected positioning information in the image taken by the image collector before the vertical moving unit moves the pallet fork vertically upwards from the target position by the preset distance; and a target distance determining unit configured to: determine a height of a lowest position of the storage container according to the angle deviation and an attribute of the storage container when the determining unit determines that the angle deviation of the collected positioning information in the horizontal direction is greater than the preset angle threshold; and then determine a target distance based on the height of the lowest position of the storage container and the height of the bottom face of the target layer of the target stock container; and move the pallet fork vertically upwards from the target position by the target distance; wherein the attribute of the storage container includes a length of the storage container.

Correspondingly, the vertical moving unit is further configured to move the pallet fork vertically upwards from the target position by the preset distance when the determining unit determines that the angle deviation of the collected positioning information in the horizontal direction is not greater than the preset angle threshold.

On the basis of the foregoing embodiments, the attribute of the storage container includes a width of the storage container.

Correspondingly, the distance adjusting and control module is further configured to:

sum the distance between the front end of the pallet fork and the target stock container collected by the distance sensor and the width of the storage container, the obtained sum value being regarded as a horizontal distance that the pallet fork needs to move towards the target stock container when returning the storage container.

On the basis of the foregoing embodiments, the device further includes:

a moving module configured to instruct the high-position robot to carry the storage container and move to a preset position, wherein the preset position is located right in front of the target stock container and a distance from the preset position to the target stock container is within a pre-configured distance interval.

On the basis of the foregoing embodiments, the positioning information is fixedly provided in a fixed position on each layer of the target stock container, wherein the fixed position includes a position on the target layer of the target stock container and right opposite to the image collector arranged on the pallet fork after the pallet fork lifts the storage container up to the same height as the target layer of the target stock container.

On the basis of the foregoing embodiments, the device further includes:

an exiting module configured to exit the pallet fork and control the pallet fork to be lowered to an initial position after the storage container is returned.

The calibration device for returning a storage container according to the embodiment of the present invention can execute the method for calibrating a storage container according to any embodiment of the present invention and has corresponding functional modules for executing the method and achieves corresponding beneficial effects.

Tenth Embodiment

This embodiment of the present invention provides a storage medium including a computer-executable instruction, and when executed by a computer processor, the computer-executable instruction is used to perform a method for calibrating a storage container; the method includes:

adjusting and controlling a positional relationship between a pallet fork and a projection image of positioning information on a specified plane according to image data obtained by an image collector after the pallet fork lifts a storage container to be placed up to a same height as a target layer of a target stock container; and adjusting and controlling a distance between the pallet fork and the target stock container according to distance data.

Certainly, in the storage medium including a computer-executable instruction according to the embodiment of the present invention, the computer-executable instruction is not limited to executing the operation of the method described above, and can also execute related operations in the method for calibrating a storage container according to any embodiment of the present invention.

Any combination of one or more computer-readable media may be employed as a computer storage medium in the embodiments of the present invention. The computer-readable medium may be a computer-readable signal medium or a computer-readable storage medium. The computer-readable storage medium may be, for example, but not limited to, an electrical, magnetic, optical, electromagnetic, infrared, or semiconductor system, apparatus, or device, or any combination thereof. More specific examples (non-exhaustive list) of the computer-readable storage medium include: an electrical connection having one or more wires, a portable computer disk, a hard disk, a random access memory (RAM), a read only memory (ROM), an erasable programmable read-only memory (EPROM or flash memory), optical fiber, a portable compact disk read-only memory (CD-ROM), an optical storage device, a magnetic storage device, or any suitable combination of thereof. A computer-readable storage medium herein may be any tangible medium that contains or stores a program that may be used by or in conjunction with an instruction execution system, apparatus, or device.

The computer-readable signal medium may include a data signal propagating in the baseband or as part of the carrier and carrying computer-readable program code therein. The data signal propagating in this way may take many forms, including but not limited to an electromagnetic signal, an optical signal, or any suitable combination of thereof. The computer-readable signal medium may also be any computer-readable storage medium other than a computer-readable storage medium. The computer-readable medium may send, propagate, or transmit a program for use by or in conjunction with an instruction execution system, apparatus, or device.

The program code contained in the computer-readable medium may be transmitted by any suitable medium, including but not limited to wireless, wire, cable, RF, or any suitable combination thereof.

The computer program code for performing the operation of the present invention may be written in one or more programming languages or a combination thereof, including object-oriented programming languages, such as Java, Smalltalk, C++, and also including conventional procedural programming language, such as "C" language or similar programming languages. The program code may be executed on a user computer entirely or partially, or executed as a separate software package, or partially executed on a user computer or on a remote computer, or entirely executed on a remote computer or server. In the case of a remote computer, the remote computer may be connected to the user computer through any kind of network, including a local area network (LAN) or a wide area network (WAN), or it may be connected to an external computer, for example, via the Internet provided by an Internet service provider).

Figure 12:
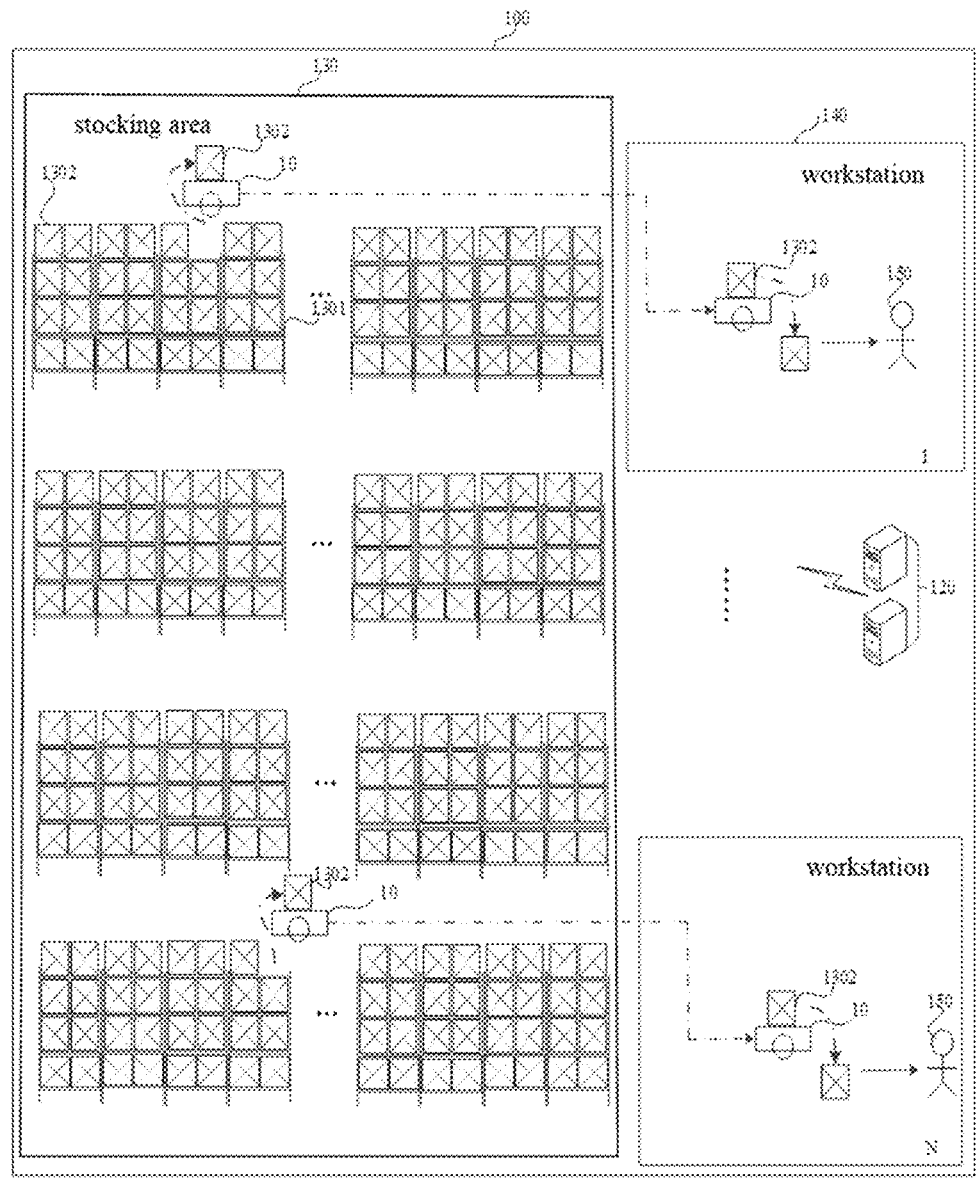
FIG. 12 is a schematic structural diagram of a storage system according to an embodiment of the present invention.

An embodiment of the present invention further provides a method and device for determining a driving strategy, a high-position robot, and a storage medium, which can be applied to any scenario where cargoes need to be handled, such as in the field of storage and logistics. As a mobile robot, the high-position robot gradually replaces humans to handle the cargoes between different workstations in a work area. In order to better understand the working conditions of the high-position robot in a storage system, the following description provides an example of a scenario where a bulk item arrives at a warehouse and the high-position robot loads the bulk item onto a high-position rack; however, the scenarios where high-position robots can work are not limited to this. For details, reference may be made to the schematic structural diagram of a storage system shown in FIG. 12. The system 100 may include: a high-position robot 10, a control server 120, a stocking area 130, and a workstation 140. The stocking area 130 is provided with a plurality of racks 1301 (for example, in order to improve the storage efficiency of the warehouse, the racks may be high-position racks; the following description takes an example where the racks in the stocking area 130 are the high-position racks 1301), and various bulk items (for example, boxes of colas) are stored on the high-position racks 1301.

The control server 120 can conduct wireless communication with the high-position robot 10, a worker enables the control server 120 to work through a console, and the high-position robot 10 performs a corresponding task under the control of the control server 120. For example, the control server 120 plans a moving path for the high-position robot 10 according to the task, and the high-position robot 10 travels along unoccupied space (part of passages for high-position robot 10) in a high-position rack array formed by the high-position racks 1301 according to the moving path. In order to facilitate the planning of the moving path for the high-position robot 10, the work area of the high-position robot 10 (the work area at least includes the stocking area 130 and areas where the workstations 140 are located) is divided into a number of sub-areas (i.e., cells), and the high-position robot 10 goes by the sub-areas one by one to form a moving track.

A component of the high-position robot 10 for picking and placing cargoes or the storage containers is called picking-and-placing component. For the high-position forklift, the pallet fork serves as the picking-and-placing component. For the high-position container handling robot, the telescopic assembly and the deflector finger serve as the picking-and-placing component.

The high-position robot 10 may further include a controller for controlling up and down parallel movement of the picking-and-placing component, a target identifying component, and a navigation identifying component such as a camera or the like. The high-position robot 10 can pick up or store a storage container 1302 from the high-position rack 1301 of the stocking area 130 through mutual cooperation of the picking-and-placing component, the controller and other components configured thereon. The storage containers 1302 are placed on the high-position rack 1301 for storing various bulk items. In at least one embodiment, the storage containers 1302 may be configured as pallets, or bins or the like.

In some embodiments, when bulk items arrive at the warehouse, the control server 120 can determine a target storage container 1302 and a target high-position rack 1301 for storing the target storage container 1302 according to a storage situation of the stocking area 130; and determine a target workstation 140 to perform a current operation task (i.e., a loading task); and further can determine a target high-position robot 10 for handling the target storage container 1302, and plan a driving path for the target high-position robot 10; and then send a control instruction to the target high-position robot 10. In response to the control instruction, the high-position robot 10 can drive to the target high-position rack 1301 in the stocking area 130 according to the driving path and a navigation component, and determine, based on the target identifying component, a position of the target storage container 1302 to be obtained on the target high-position rack 1301.

The controller in the high-position robot 10 adjusts the picking-and-placing component to a height of the target storage container, and controls the picking-and-placing component to obtain the target storage container.

When the high-position robot 10 serves as a high-position forklift, a controller in the high-position forklift adjusts a pallet fork to the height of the target storage container, and controls the pallet fork to fork out and reach a bottom of the target storage container to obtain the target storage container.

When the high-position robot 10 serves as a high-position container handling robot, a controller in the high-position container handling robot adjusts the telescopic assembly to the height of the target storage container, and controls the telescopic assembly to extend out and surround two sides of the target storage container to obtain the target storage container.

Then, the high-position container handling robot travels to the work area where workers or loading robots 150 are located in the target workstation 140 according to the driving path, so that the workers or the loading robots 150 can place the bulk items in the target storage container 1302. After the operation task for the target storage container 1302 is completed, the target high-position robot 10 can also move the target storage container 1302 from the target workstation 140 back to the stocking area (not shown in FIG. 12).

However, in a large-scale logistics work area with a complex environment, in order to ensure that the high-position robot can safely move cargoes to a destination, it is required to formulate an accurate driving strategy. At present, a height of a body of the high-position robot (i.e., a height of a gantry of the high-position robot) is usually used as a threshold to determine space in which the high-position robot can travel, and then a driving strategy of the high-position robot is determined based on paths in the space in which the high-position robot can travel. However, in actual scenarios, in order to improve the work efficiency of the high-position robot, cargoes loaded by the high-position robot will exceed the threshold and in this case, if the high-position robot still adopts the driving strategy specified in the above solution, during the driving process, it is more likely to cause the problem that he high-position robot fails to reach the destination safely because the cargoes on the high-position robot collide with a high-altitude object. In addition, the solution where the driving strategy of the high-position robot is formulated only based on the height of the body of the high-position robot does not take emergencies that may occur during the driving process of the high-position robot, such as the falling of the cargoes on the high-position robot and blockage in the driving direction, which will also cause the high-position robot to fail to reach the destination safely. It can be seen that formulating the driving strategy for the high-position robot on the basis of the height of the body of the high-position robot body cannot guarantee the safety of the high-position robot.

Therefore, in order to improve the driving safety of the high-position robot, based on the feature that a depth camera with a large field angle can detect the high-position robot in all directions, this embodiment uses the depth camera as a sensor to avoid obstacles, that is, the depth camera is installed on the high-position robot. Based on this, the technical solutions of the embodiments of the present invention are introduced below to solve this problem.

Eleventh Embodiment

Figure 13A:
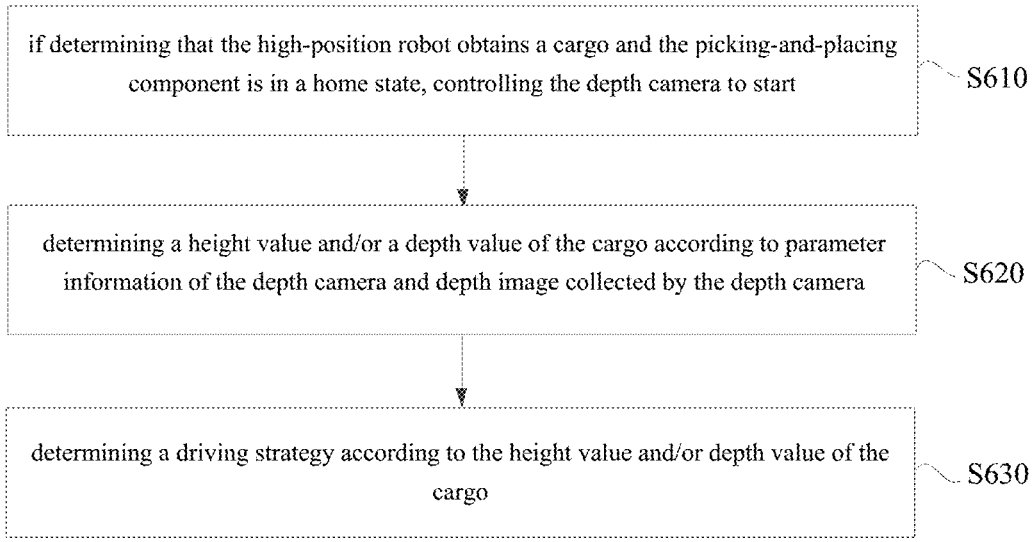
FIG. 13A is a flowchart of a method for determining a driving strategy according to the first embodiment of the present invention.
Figure 13B:
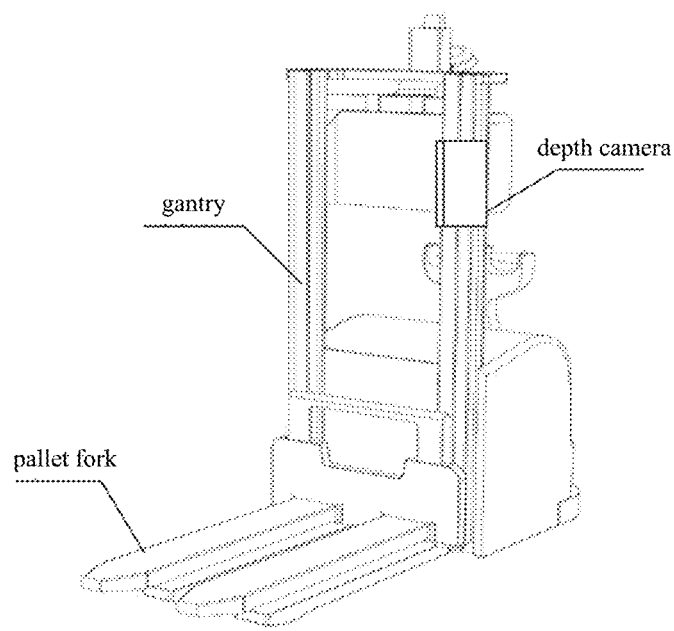
FIG. 13B is a schematic diagram of a high-position robot without cargoes according to the first embodiment of the present invention.

FIG. 13A is a flowchart of a method for determining a driving strategy according to the first embodiment of the present invention. This embodiment is directed to the problem how to ensure that the high-position robot safely transports a cargo to a destination. The method can be executed by the device for determining a driving strategy or the high-position robot according to the embodiments of the present invention. The device for determining a driving strategy can be implemented by software and/or hardware, and can be configured on the high-position robot; the device can also be configured as an independent device that can communicate with the high-position robot. In at least one embodiment, the device for determining a driving strategy is configured on the high-position robot, and the high-position robot can be equipped with a depth camera as a collecting module. Further, the depth camera can be installed on the gantry of the high-position robot and parallel to the gantry, as shown in FIG. 13B. In addition, the high-position robot is also equipped with a processor module to process the collected data to determine the driving strategy of the high-position robot. Referring to FIG. 13A, in some embodiments the method includes the following steps.

In step S610, if it is determined that the high-position robot obtains a cargo and the picking-and-placing component is in a home state, the depth camera is controlled to start.

In FIGS. 13B and 13C, a high-position forklift is illustrated as an example for description.

In this embodiment, there are many ways to determine that the high-position robot obtains the cargo, and it is not limited in the present application. In some embodiments, which way will be adopted can be determined according to the type of a detection unit (such as a sensor) in a processor module configured for the high-position robot. In at least one embodiment, the processor module configured for the high-position robot includes at least one of a weight sensor, a laser radar and the like. Therefore, the weight sensor can be configured to detect whether the high-position robot obtains the cargo; whether the high-position robot obtains the cargo can also be determined by comparing laser data obtained by the laser radar scanning the high-position robot this time with laser data obtained by the laser radar scanning a no-load high-position robot.

In order for the high-position robot to be able to transport a cargo smoothly, after obtaining the cargo, the high-position robot needs to adjust the picking-and-placing component to be in the home state. In the case where the high-position robot serves as a high-position pallet fork, the picking-and-placing component being in a home position means that the pallet fork is in a lowest allowable position, as shown in FIG. 13C. In the case where the high-position robot serves as a high-position container handling robot, the picking-and-placing component being in a home position means that the telescopic assembly is in a lowest allowable position.

In this embodiment, the depth camera is configured in the high-position robot. Further, the depth camera can be installed on the gantry of the high-position robot and parallel to the gantry, as shown in FIGS. 13B and 13C. The depth camera is configured to collect a depth image in a specified azimuth according to a preset period. The depth image refers to an image with a distance/depth from the image collector to each point in a scene as a pixel value and it directly reflects a geometric shape of a visible surface of the scene. The preset period refers to a preset collecting frequency of the depth camera, which can be corrected according to the actual exposure and light conditions. In at least one embodiment, the depth camera may be a TOF (Time of Flight) depth camera or a structured light depth camera or the like.

In some embodiments, the high-position robot can determine whether it obtains the cargo according to the weight data measured by the weight sensor configured on the high-position robot or the laser data collected by the laser radar or the like; when it is determined that the high-position robot obtains the cargo, the high-position robot can control and adjust the picking-and-placing component to the home state; after determining that the picking-and-placing component is in the home state, the high-position robot controls the depth camera configured thereon to start so that the depth camera collects the depth image in the specified azimuth according to the preset period.

In step S620, a height value and/or a depth value of the cargo are/is determined according to parameter information of the depth camera and the depth image collected by the depth camera.

In this embodiment, the parameter information of the depth camera may include internal parameters and external parameters of the depth camera, wherein the internal parameters of the depth camera are inherent parameters of the depth camera, do not change with an external environment, and may include a resolution, field angle (vertical field angle and horizontal field angle), focal length, and the like of the depth camera; the external parameters of the depth camera are parameters set on the basis of the external environment and may include an installation position, a rotation angle and the like of the depth camera.

A vertical distance from any point in the cargo to a bottom of the picking-and-placing component in the high-position robot, such as a bottom of the pallet fork of the high-position forklift or a bottom of the telescopic assembly of the high-position handling robot, can be regarded as a height value of the point in the cargo, so a height value of the cargo can be a vertical distance from a highest point in the cargo to the bottom of the picking-and-placing component in the high-position robot; it can also be a sum of a vertical distance from any point (e.g., a center point) in the cargo to the bottom of the picking-and-placing component in the high-position robot and a preset distance value. In at least one embodiment, the latter is greater than or equal to the former, and a difference between the latter and the former is within an allowable error range, for example, a range of 0 to 5 cm. The preset distance value refers to a distance value set in advance, and different cargo shapes correspond to different preset distance values. It should be noted that a difference between the height value of the cargo and an actual height of the cargo is within an allowable error range; that is, in this embodiment, the height value of the cargo is the actual height of the cargo.

In at least one embodiment, information of each point of the cargo can be determined according to the depth image, and then the height value of the cargo can be determined according to the parameter information of the depth camera and the information of each point of the cargo; the information of each point of the cargo can include pixel coordinates of each point of the cargo in the depth image. In some embodiments, for any point, its pixel coordinates may be (x, y, z), where z represents the depth value of the point in the cargo. In some embodiments, the pixel coordinates of each point of the cargo can be determined according to the depth image, and the pixel coordinates of the center point of the cargo can be extracted from the pixel coordinates of each point of the cargo; a center distance value of the cargo is determined according to the parameter information of the depth camera and the pixel coordinates of the center point of the cargo; then, the center distance value of the cargo and the preset distance value are summed, and the obtained sum value is regarded as the height value of the cargo. Alternatively, the pixel coordinates of each point of the cargo can be determined according to the depth image, and the pixel coordinates of the highest point of the cargo can be extracted from the pixel coordinates of each point of the cargo; and then the height value of the cargo is determined according to the parameter information of the depth camera and the pixel coordinates of the highest point of the cargo.

Correspondingly, a distance from any point in the cargo to the depth camera can be regarded as a depth value of the point in the cargo, so the depth value of the cargo can be the distance from the highest point in the cargo to the depth camera, or a sum of a distance from any point (e.g., the center point) in the cargo to the depth camera and a preset depth value. In at least one embodiment, the latter is greater than or equal to the former, and a difference between the latter and the former is within an allowable error range, for example, a range of 0 to 5 cm. The preset depth value refers to a depth value set in advance, and different cargo shapes correspond to different preset depth values.

In at least one embodiment, information of each point of the cargo can be determined according to a depth image and then the depth value of the cargo can be determined according to the information of each point of the cargo. In some embodiments, the pixel coordinates of each point of the cargo can be determined according to the depth image, and the pixel coordinates of the center point of the cargo can be extracted from the pixel coordinates of each point of the cargo; a center depth value of the cargo is determined according to the pixel coordinates of the center point of the cargo; then, the center depth value of the cargo and the preset depth value are summed, and the obtained sum value is regarded as the depth value of the cargo. Alternatively, the pixel coordinates of each point of the cargo can be determined according to the depth image, and the pixel coordinates of the highest point of the cargo can be extracted from the pixel coordinates of each point of the cargo; and then the depth value of the cargo is determined according to the pixel coordinates of the highest point of the cargo.

In step S630, a driving strategy is determined according to the height value and/or depth value of the cargo.

In this embodiment, the driving strategy may include an obstacle avoidance driving strategy and an emergency driving strategy. The obstacle avoidance driving strategy can be used to instruct the high-position robot to perform a corresponding operation when the high-position robot encounters an obstacle, and to plan a driving path; the emergency driving strategy refers to a strategy provided for an emergency event that occurs during the travel of the high-position robot (such as an emergency event that a cargo falls from the high-position robot and blocks the high-position robot in running).

In some embodiments, the driving strategy may be determined according to the height value and/or depth value of the cargo in the following ways: 1) The obstacle avoidance driving strategy and the emergency driving strategy in driving strategies are determined according to the height value of the cargo; for example, the obstacle avoidance driving strategy in driving strategies is determined according to the height value of the cargo, the height value of the body of the high-position robot and the like; a corresponding emergency driving strategy and the like are determined according to the change of the height value of the cargo. 2) The obstacle avoidance driving strategy in driving strategies is determined according to the height value of the cargo and the emergency driving strategy in driving strategies is determined according to the depth value of the cargo; for example, a corresponding emergency driving strategy and the like are determined according to the change of the depth value of the cargo. 3) The emergency driving strategy and the like in driving strategies are determined according to the height value and depth value of the cargo. In some embodiments, how to determine the driving strategy based on the height value and/or depth value of the cargo will be described in detail in the following embodiments.

In the technical solution of the embodiment of the present invention, when it is determined that the high-position robot obtains the cargo and the picking-and-placing component is in the home state, the depth camera is controlled to start to obtain a depth image in real time; then, the height value and/or depth value of the cargo are/is determined according to the parameter information of the depth camera and the depth image collected by the depth camera; and then a driving strategy is determined for the high-position robot according to the height value and/or depth value of the cargo. Compared with an existing technical solution, this solution determines a driving strategy according to a height value and/or depth value of a cargo, and fully considers the actual situation of the high-position robot carrying the cargo, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination.

Twelfth Embodiment

FIG. 14A is a flowchart of a method for determining a driving strategy according to the second embodiment of the present invention. This embodiment is based on the foregoing embodiment; in order to determine an accurate driving strategy for the high-position robot and realize simple calculation. As an example, the height value and depth value of the cargo are the height value and depth value of the highest point of the cargo. The height value of the highest point of the cargo here is used to represent the vertical distance from the highest point of the cargo to the bottom of the picking-and-placing component in the high-position robot; the depth value of the highest point of the cargo is used to represent the distance from the highest point of the cargo to the depth camera. In this case, determining the height value and/or depth value of the cargo according to parameter information of the depth camera and the depth image collected by the depth camera is further described. Referring to FIG. 14A, in some embodiments the method includes the following steps.

In step S710, if it is determined that the high-position robot obtains a cargo and the picking-and-placing component is in a home state, the depth camera is controlled to start.

In step S720, if there is a depth value less than a fixed depth value in the depth image, highest point information of the cargo is obtained, wherein the fixed depth value is a vertical distance value from the depth camera to an outermost side of the picking-and-placing component in the high-position robot.

The outermost side of the picking-and-placing component may be, for example, a tail end of the pallet fork of the high-position forklift, or may be a side of the telescopic assembly of the high-position container handling robot close to the depth camera.

In this embodiment, the highest point information of the cargo may include pixel coordinates of the highest point of the cargo in the depth image, and the pixel coordinates may be (x, y, z), where z represents a depth value of the highest point of the cargo. The height value of the highest point of the cargo can be denoted as L1, the depth value of the highest point of the cargo can be denoted as D1, and the fixed depth value can be denoted as L2. As shown in FIG. 14B, it is a simplified right view of the high-position robot with a cargo, assuming that the highest point of the cargo is point B.

In at least one embodiment, based on practical verification, when there is no cargo on the high-position robot, depth values in the depth image collected by the depth camera are all greater than the fixed depth value; and when there is a cargo on the high-position robot, there is a depth value less than the fixed depth value in the depth image collected by the depth camera. Therefore, based on the above practical verification, the fixed depth value can be used as a reference to determine that there is a depth value less than the fixed depth value in the depth image collected by the depth camera, which functions as a trigger mechanism to obtain the highest point information of the cargo, i.e., a trigger mechanism for determining height and depth values of the highest point. In addition, the determination that there is a depth value less than the fixed depth value in the depth image collected by the depth camera can also serves as a condition for determine whether the high-position robot obtains the cargo or not. In this case, the depth camera needs to be in an ON state in real time.

In some embodiments, after the depth camera is started, it will collect a depth image in a specified azimuth according to the preset period; and then the high-position robot analyzes the depth image collected by the depth camera. further, a processor module configured in the high-position robot analyzes the depth image collected by the depth camera, and if it is determined that there is a depth value less than the fixed depth value in the depth image collected by the depth camera, the highest point information of the cargo is obtained from the depth image.

In step S730, the height value and/or the depth value of the highest point of the cargo are/is determined according to the parameter information of the depth camera and the highest point information of the cargo.

In this embodiment, the height value and/or depth value of the highest point of the cargo can be determined according to the parameter information of the depth camera and the pixel coordinates in the highest point information of the cargo. In some embodiments, the depth value of the highest point of the cargo is determined according to the pixel coordinates of the highest point of the cargo; the height value of the highest point of the cargo is determined according to the parameter information of the depth camera and the pixel coordinates of the highest point of the cargo.

In step S730, a driving strategy is determined according to the height value and/or the depth value of the cargo.

In the technical solution of the embodiment of the present invention, when it is determined that the high-position robot obtains the cargo and the picking-and-placing component is in the home state, the depth camera is controlled to start to obtain a depth image in real time; then, if it is determined that there is a depth value less than the fixed depth value in the depth image, the height value and the depth value of the cargo are determined according to the parameter information of the depth camera and the depth image collected by the depth camera; and then a driving strategy is determined for the high-position robot according to the height value or the depth value of the cargo. Compared with an existing technical solution, this solution determines a driving strategy according to a height value and/or depth value of a cargo, and fully considers the actual situation of the high-position robot carrying the cargo, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination. In addition, the addition of the trigger mechanism for determining the height value and the depth value of the cargo optimizes the method for determining a driving strategy according to the first embodiment.

Thirteenth Embodiment

FIG. 15A is a flowchart of a method for determining a driving strategy according to the third embodiment of the present invention. On the basis of the foregoing embodiment, this embodiment further explains and describes the process of determining the height value and the depth value of the highest point of the cargo according to the parameter information of the depth camera and the depth image collected by the depth camera. Referring to FIG. 15A, in some embodiments the method includes the following steps.

In step S810, if it is determined that the high-position robot obtains a cargo and the picking-and-placing component is in a home state, the depth camera is controlled to start.

In step S820, the depth value of the highest point of the cargo is determined according to the pixel coordinates of the highest point of the cargo in the depth image.

In this embodiment, the highest point information of the cargo may include the pixel coordinates of the highest point of the cargo in the depth image, and the pixel coordinates may be (x, y, z), where z represents the depth value of the highest point of the cargo. In some embodiments, a value of z can be extracted from the pixel coordinates of the highest point of the cargo in the depth map, and the value of z can be used as the depth value of the highest point of the cargo.

In step S830, a horizontal included angle between the highest point of the cargo and the depth camera is determined according to the pixel coordinates of the highest point of the cargo in the depth image, and the vertical field angle and resolution in the parameter information.

Figure 15B:
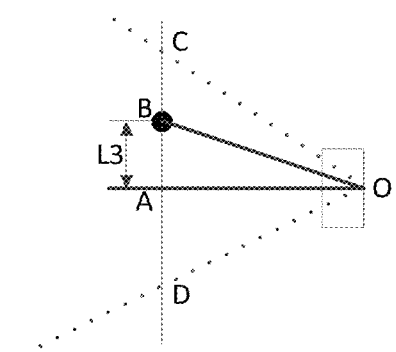
FIG. 15B is a schematic diagram of calculating a height value of a cargo according to the third embodiment of the present invention.

The field angle involved in this embodiment is a scale that measures the maximum field angle that a camera can "see", and usually takes an angle as a unit. In at least one embodiment, in this embodiment, a TOF depth camera may be used to collect a depth image in a specified azimuth; taking the horizontal and vertical planes of the space where the depth camera is located as a reference, the vertical field angle of the depth camera may be denoted as a, for example, Angle COD as shown in FIG. 15B. FIG. 15B is a schematic diagram of calculating a height value of a cargo, constructed by extracting the depth camera and the highest point of the cargo on the basis of FIG. 14B.

Figure 15C:
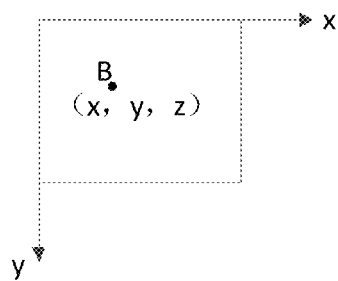
FIG. 15C is a schematic diagram of a depth image coordinate system according to the second embodiment of the present invention.

The resolution in the parameter information of the depth camera refers to a resolution of the depth image collected by the depth camera, which can be denoted as M*N, and the vertical field angle of the depth camera corresponds to N rows of the depth image; the pixel coordinates of the highest point of the cargo in the depth image can be (x, y, z), where z represents the depth value of the highest point of the cargo, i.e., a distance between B and O in FIG. 15B. In addition, in this embodiment, a coordinate system of the depth image collected by the depth camera is as shown in FIG. 15C. The horizontal included angle between the highest point of the cargo and the depth camera, i.e., Angle BOA, can be denoted as b.

Based on the principle that the ratios of different vertical field angles to row data are equal, the following expression can be obtained:

$$\frac{\frac{N}{2} - y}{b} = \frac{N}{a}$$

Based on the above expression, the horizontal included angle between the highest point of the cargo and the depth camera can be derived as $$b = \frac{\left(\frac{N}{2} - y\right) * a}{N}.$$

The description "the principle that the ratios of different vertical field angles to row data are equal" can be understood as: the vertical field angle corresponds to the height of the image, i.e., the number of rows. For example, if the vertical field angle is 30° and the image height is 60 rows, then each degree corresponds to the height of 2 rows. As what disclosed in this embodiment, the total number of rows of the image is denoted as N, and the vertical field angle is denoted as a, then the field angle corresponding to each row is expressed as N/a. The number of rows corresponding to the horizontal included angle b between the highest point of the cargo and the depth camera is known and expressed as N/2-y, and it also satisfies the expression of thee field angle corresponding to each row, i.e., (N/2-y)/b. The meanings of these two data results are the same, the two are equal.

In step S840, the height value of the highest point of the cargo is determined according to the horizontal included angle, the depth value of the highest point of the cargo, and installation position information in the parameter information.

In some embodiments, referring FIG. 15B again, after the horizontal included angle b between the highest point of the cargo and the depth camera is determined, the height value of the highest point of the cargo can be determined according to the horizontal included angle, the depth value of the highest point of the cargo, and the installation position information in the parameter information. In some embodiments, a vertical height of the highest point of the cargo relative to the depth camera is determined according to the horizontal included angle and the depth value z of the highest point of the cargo, and then the height value of the highest point of the cargo can be determined according to the vertical height and the installation position information in the parameter information.

As an example, the height value of the highest point of the cargo is determined according to the horizontal included angle, the depth value of the highest point of the cargo, and the installation position information in the parameter information by the following specific steps.

A. The vertical height of the highest point of the cargo relative to the depth camera is determined according to the horizontal included angle and the depth value of the highest point of the cargo.

Referring to FIG. 15B again, the horizontal included angle is denoted as b, the depth value of the highest point of the cargo (i.e., the distance between B and O in FIG. 15B) is denoted as z, and the vertical height of the highest point of the cargo relative to the depth camera can be denoted as L3. By calculating sinb, the vertical height L3 of the highest point of the cargo relative to the depth camera can be determined.

B. The height value of the highest point of the cargo is determined according to the vertical height and the installation position information in the parameter information.

In this embodiment, the installation position information in the parameter information is the installation position of the depth camera in the high-position robot, which can be denoted as L4, as shown in FIG. 14B.

In some embodiments, after the vertical height L3 of the highest point of the cargo relative to the depth camera is determined, the vertical height L3 and the installation position information L4 in the parameter information are summed, and the sum result is regarded as the height value L1 of the highest point of the cargo.

In step S850, a driving strategy is determined according to the height value and/or the depth value of the cargo.

In the technical solution of the embodiment of the present invention, when it is determined that the high-position robot obtains the cargo and the picking-and-placing component is in the home state, the depth camera is controlled to start to obtain a depth image in real time; then, the height value and depth value of the cargo are determined according to the parameter information of the depth camera and the depth image collected by the depth camera; and then a driving strategy is determined for the high-position robot according to the height value and/or depth value of the cargo. Compared with an existing technical solution, this solution determines a driving strategy according to a height value and/or depth value of a cargo, and fully considers the actual situation of the high-position robot carrying the cargo, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination.

Fourteenth Embodiment

Figure 16:
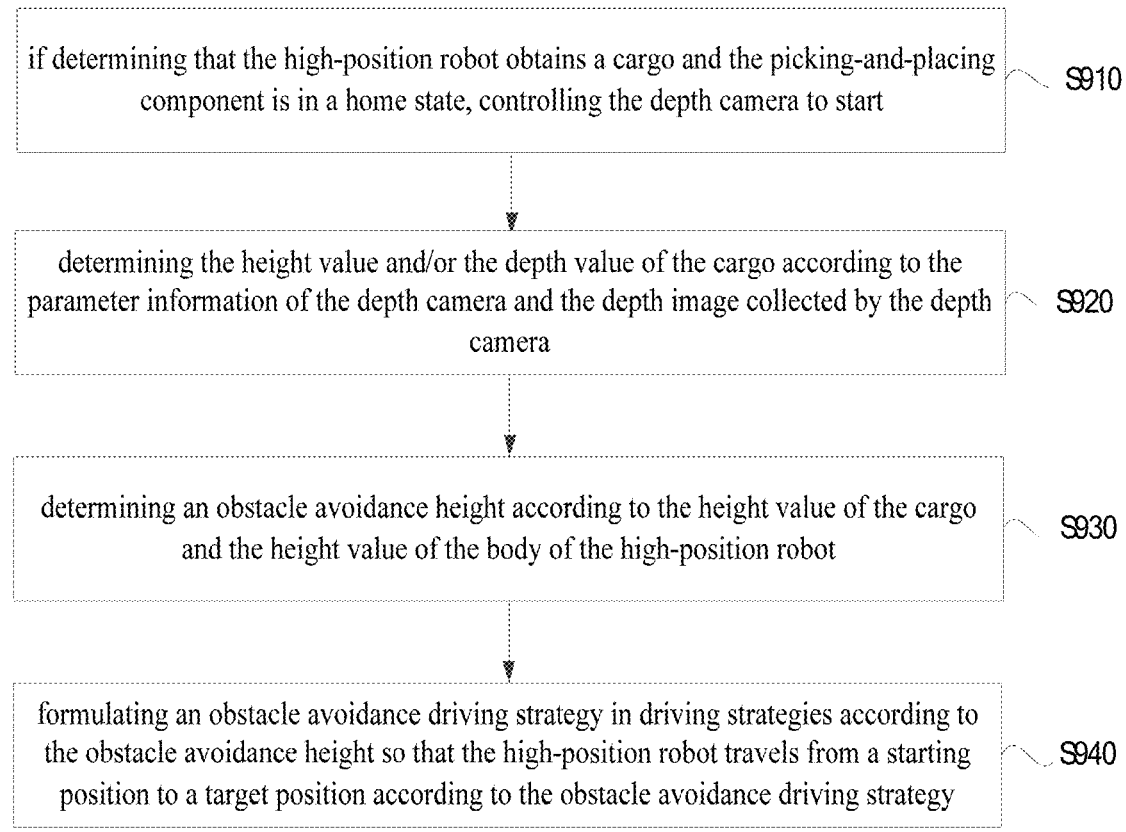
FIG. 16 is a flowchart of a method for determining a driving strategy according to a fourth embodiment of the present invention.

FIG. 16 is a flowchart of a method for determining a driving strategy according to a fourth embodiment of the present invention. On the basis of the foregoing embodiment, this embodiment further explains the determination of the driving strategy based on the height value of the cargo. Referring to FIG. 16, in some embodiments the method includes the following steps.

In step S910, if it is determined that the high-position robot obtains a cargo and the picking-and-placing component is in a home state, the depth camera is controlled to start.

In step S920, the height value and/or the depth value of the cargo are/is determined according to the parameter information of the depth camera and the depth image collected by the depth camera.

In step S930, an obstacle avoidance height is determined according to the height value of the cargo and the height value of the body of the high-position robot.

In this embodiment, within a certain error tolerance range, the height value of the body of the high-position robot is the height value of the gantry of the high-position robot. The obstacle avoidance height is a reference for formulating an obstacle avoidance driving strategy or an obstacle avoidance driving path for the high-position robot, and the obstacle avoidance height can be the higher one of the height value of the cargo and the height value of the body of the high-position robot.

In some embodiments, after the height value of the cargo is determined, the height value of the cargo can be compared with the height value of the body of the high-position robot, and the obstacle avoidance height can be determined according to the comparison result. For example, when the height value of the cargo is higher than the height value of the body of the high-position robot, the obstacle avoidance height is based on the height value of the cargo; when the height value of the cargo is lower than the height value of the body of the high-position robot, the obstacle avoidance height is based on the height value of the body of the high-position robot.

In step S940, an obstacle avoidance driving strategy in driving strategies is formulated according to the obstacle avoidance height so that the high-position robot travels from a starting position to a target position according to the obstacle avoidance driving strategy.

In this embodiment, the obstacle avoidance driving strategy is one of the driving strategies and can be used to instruct the high-position robot to perform a corresponding operation when the high-position robot encounters an obstacle; for example, the high-position robot may be instructed to stop running or take another path to run to the target position from the current position. The obstacle avoidance driving strategy can also plan a driving path for the high-position robot. The target position refers to a destination position to be reached by the robot, for example, it may be the picking area of the picking station.

In at least one embodiment, the obstacle avoidance driving strategy of the high-position robot can be formulated according to the obstacle avoidance height to plan a driving path from the starting position to the target position for the high-position robot and plan operations executed by the high-position robot when the high-position robot encounters an obstacle during running according to the driving path. In this way, the high-position robot can run from the starting position to the target position according to the obstacle avoidance driving strategy. For example, all the possible driving paths from the starting position to the target position are determined, and then driving paths that meet a condition (that is, the height of the space area where the driving path is located is higher than the obstacle avoidance height) are selected from all the possible driving paths according to the obstacle avoidance height; and based on a "shortest path" principle, a driving path of the high-position robot from the starting position to the target position is selected from the driving paths that meet the condition. If the high-position robot encounters an obstacle (the obstacle can be an obstacle suspended in the air) during the course of driving according to the driving path, the high-position robot can plan another path from the current position of the high-position robot (the position of the obstacle, or a position close to the obstacle) to the target position according to the obstacle avoidance driving strategy and then drive to the target position. In at least one embodiment, the high-position robot can stop to the current position according to the obstacle avoidance driving strategy, wait for another high-position robot or staff to remove the obstacle in front (which can be an obstacle on the ground), and then travel to the target position according to the original driving path.

It should be noted that this embodiment fully considers the actual situations of cargo transportation, not only considers the impact of an obstacle on the ground on the travel of the high-position robot, but also selects the height value of the cargo as the obstacle avoidance height when the height value of the cargo is higher than the height value of the body of the high-position robot. The impact of an obstacle suspended in the air (which is higher than the height value of the body of the high-position robot but lower than the height value of the cargo) on the high-position robot is also taken into full consideration. In this way, it can be ensured that the high-position robot safely transports the cargo to the destination.

In the technical solution of the embodiment of the present invention, when it is determined that the high-position robot obtains the cargo and the picking-and-placing component is in the home state, the depth camera is controlled to start to obtain a depth image in real time; then, the height value and depth value of the cargo can be determined according to the parameter information of the depth camera and the depth image collected by the depth camera; and then the obstacle avoidance height can be determined according to the height value of the cargo and the height value of the body of the high-position robot, and an obstacle avoidance driving strategy can be formulated for the high-position robot according to the obstacle avoidance height, so that the high-position robot can travel from the current position to the target position according to the obstacle avoidance driving strategy. Compared with an existing technical solution, in combination with the actual situations of high-position robot handling the cargo, this solution not only considers the impact of an obstacle on the ground on the travel of the high-position robot, but also fully considers the impact of an obstacle suspended in the air on the travel of the high-position robot, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination.

Fifteenth Embodiment

Figure 17:
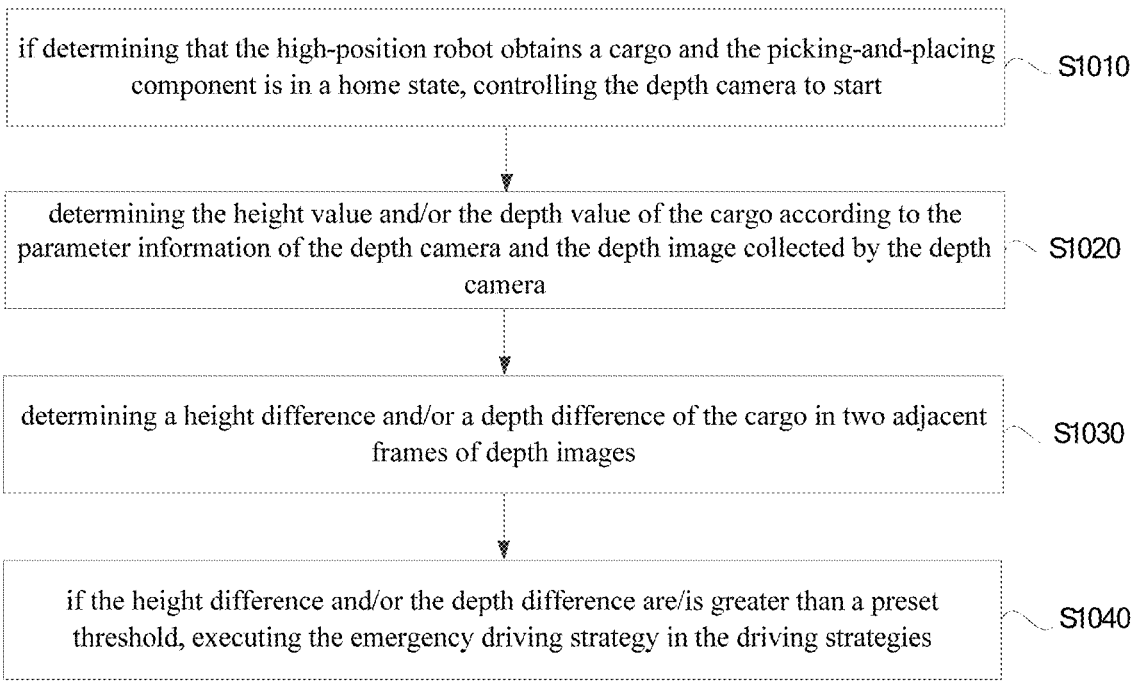
FIG. 17 is a flowchart of a method for determining a driving strategy according to the fifth embodiment of the present invention.

FIG. 17 is a flowchart of a method for determining a driving strategy according to the fifth embodiment of the present invention; On the basis of the foregoing embodiment, this embodiment further explains the determination of the driving strategy based on the height value or depth value of the cargo. Referring to FIG. 17, in some embodiments the method includes the following steps.

In step S1010, if it is determined that the high-position robot obtains a cargo and the picking-and-placing component is in a home state, the depth camera is controlled to start.

In step S1020, the height value and/or the depth value of the cargo is determined according to the parameter information of the depth camera and the depth image collected by the depth camera.

In step S1030, a height difference and/or a depth difference of the cargo in two adjacent frames of depth images are/is determined.

In this embodiment, the height difference of the cargo is an absolute value of a difference between the height values of the cargo in the two adjacent frames of depth images; correspondingly, the depth difference of the cargo is an absolute value of a difference between the depth values of the cargo in the two adjacent frames of depth images.

In some embodiments, an absolute value of a difference between the height value of the cargo in the current frame of depth image and the height value of the cargo in the next frame of depth image can be used as the height difference of the cargo; and an absolute value of a difference between the depth value of the cargo in the current frame of depth image and the depth value of the cargo in the next frame of depth image can be used as the depth difference of the cargo For example, if the height value and depth value of the cargo are respectively the height value and depth value of the highest point of the cargo, the height value and depth value of the highest point of the cargo in the current frame of depth image can be recorded; then, an implementation process same as step S620 is carried out to determine the height value and depth value of the highest point of the cargo in next frame of depth image; then, the difference between the two determined height values of the highest point of the cargo is calculated and the absolute value of the difference is the height difference of the cargo in the two adjacent frames of depth images. Correspondingly, a difference between the two determined depth values of the highest point of the cargo is calculated, and the absolute value of the difference is the depth difference of the cargo in the two adjacent frames of depth images.

In step S1040, if the height difference and/or the depth difference are/is greater than a preset threshold, the emergency driving strategy in the driving strategies is executed.

In this embodiment, the emergency driving strategy is one of the driving strategies and is used to provide a strategy for an emergency that occurs during the travel of the high-position robot (such as an emergency event that a cargo falls from the high-position robot and blocks the high-position robot in running).

The preset threshold is a value set in advance and can be corrected according to the actual situation. The preset threshold can be used to represent the height difference and the depth difference of the cargo in two adjacent frames of depth images when there is no emergency, i.e., under normal circumstances, during the driving process of the high-position robot. The preset threshold can be defaulted to be 0. In at least one embodiment, the preset threshold may include a preset distance threshold and a preset depth threshold. In some embodiments, if the height difference and/or the depth difference are/is greater than the preset threshold, the emergency driving strategy in the driving strategies is executed as follows. If it is determined that the height difference of the cargo in the two adjacent frames of depth images is greater than the preset distance threshold, and/or if it is determined that the depth difference of the cargo in the two adjacent depth images is greater than the preset depth threshold, the emergency driving strategy can be executed.

For example, in an actual handling scenario of the high-position robot, there is no emergency, that is, under normal circumstances, the height values and depth values of the cargo in the two adjacent frames of depth images can be defaulted to be the same, that is, the height difference and the depth difference of the cargo in the two adjacent frames of depth images are 0. Therefore, if a cargo falls off the high-position robot, there will be a change in the height difference of the cargo in the two adjacent frames of depth images, that is, the height difference of the cargo in the two adjacent frames of depth images is greater than the preset distance threshold. In this case, an emergency driving strategy in the driving strategies can be executed, for example, the high-position robot takes a strategy of stopping running and sending an alarm, so that the staff can deal with the dropped cargo in time, for example, by putting the dropped cargo back on the high-position robot or moving the cargo away.

In an actual handling scenario of the high-position robot, if the relative position of the cargo on the high-position robot changes, for example, if part of the cargo is moved out of the picking-and-placing component, there will be a change in the depth difference of the cargo in the two adjacent frames of depth images, that is, the depth difference of the cargo in the two adjacent frames of depth images is greater than the preset depth threshold. In this case, an emergency driving strategy in the driving strategies can be executed, for example, the high-position robot takes a strategy of stopping running and sending an alarm, so that the staff can put the dropped cargo in place in time.

In addition, if the cargo on the high-position robot is tilted left and right, there will be changes in the depth difference and/or height difference of the cargo in the two adjacent frames of depth images, that is, the depth difference of the cargo in the two adjacent frames of depth images is greater than the preset depth threshold and/or the height difference of the cargo in the two adjacent frames of depth images is greater than the preset distance threshold. In the case, an emergency driving strategy in the driving strategies can be executed, for example, the high-position robot takes a strategy of stopping running and sending an alarm, so that the staff can put the dropped cargo in place in time.

In the technical solution of the embodiment of the present invention, when it is determined that the high-position robot obtains the cargo and the picking-and-placing component is in the home state, the depth camera is controlled to start to obtain a depth image in real time; then, the height value and depth value of the cargo are determined according to the parameter information of the depth camera and the depth image collected by the depth camera; and then the height difference and/or the depth difference of the cargo in the two adjacent frames of depth images can be determined, and when the height difference and/or the depth difference are greater than the preset threshold, an emergency driving strategy is executed. Compared with an existing technical solution, this solution comprehensively considers the emergencies that may occur in the process of the high-position robot handling cargoes, provides emergency driving strategies, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination.

Sixteenth Embodiment

Figure 18:
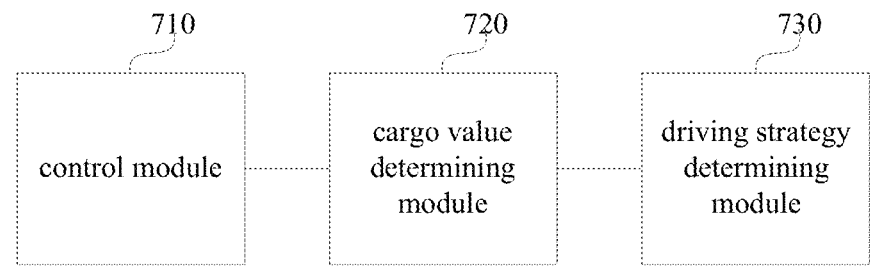
FIG. 18 is a structural block diagram of a device for determining a driving strategy according to the sixth embodiment of the present invention.

FIG. 18 is a structural block diagram of a device for determining a driving strategy according to the sixth embodiment of the present invention. The device can execute the method for determining a driving strategy according to any embodiment of the present invention and has corresponding functional modules for executing the method and achieves corresponding beneficial effects. The device can be configured in a processor of the high-position robot. As shown in FIG. 18, the device includes:

a control module 710 configured to control a depth camera to start if it is determined that the high-position robot obtains a cargo and a picking-and-placing component is in a home state;

a cargo value determining module 720 configured to determine a height value and/or a depth value of the cargo according to parameter information of the depth camera and a depth image collected by the depth camera; and a driving strategy determining module 730 configured to determine a driving strategy according to the height value and/or the depth value of the cargo.

In the technical solution of the embodiment of the present invention, when it is determined that the high-position robot obtains the cargo and the picking-and-placing component is in the home state, the depth camera is controlled to start to obtain a depth image in real time; then, the height value and/or depth value of the cargo are/is determined according to the parameter information of the depth camera and the depth image collected by the depth camera; and then a driving strategy is determined for the high-position robot according to the height value and/or depth value of the cargo. Compared with an existing technical solution, this solution determines a driving strategy according to a height value and/or depth value of a cargo, and fully considers the actual situation of the high-position robot carrying the cargo, and solves the problem that the high-position robot adopting the driving strategy formulated according to the height of the high-position robot is more likely to fail in reaching the destination safely, thus improving the driving safety of the high-position robot and ensuring that the high-position robot can safely transport the cargo to the destination.

Further, the height value and the depth value of the cargo are a height value and a depth value of a highest point of the cargo. The height value of the highest point of the cargo is used to represent a vertical distance from the highest point of the cargo to a bottom of the picking-and-placing component in the high-position robot; the depth value of the highest point of the cargo is used to represent a distance from the highest point of the cargo to the depth camera.

Further, the cargo value determining module 720 may include:

a depth value determining unit configured to determine the depth value of the highest point of the cargo according to pixel coordinates of the highest point of the cargo in the depth image;

an included angle determining unit configured to determine a horizontal included angle between the highest point of the cargo and the depth camera according to the pixel coordinates of the highest point of the cargo in the depth image, and a vertical field angle and a resolution in the parameter information; and a height value determining unit configured to determine the height value of the highest point of the cargo according to the horizontal included angle, the depth value of the highest point of the cargo, and installation position information in the parameter information.

Further, the height value determining unit may be configured to:

determine a vertical height of the highest point of the cargo relative to the depth camera according to the horizontal included angle and the depth value of the highest point of the cargo; and determine the height value of the highest point of the cargo according to the vertical height and the installation position information in the parameter information.

Further, the driving strategy determining module 730 is configured to:

determine an obstacle avoidance height according to the height value of the cargo and a height value of a body of the high-position robot; and formulate an obstacle avoidance driving strategy in driving strategies according to the obstacle avoidance height so that the high-position robot travels from the current position to a target position according to the obstacle avoidance driving strategy.

Further, the driving strategy determining module 730 is further configured to:

determine a height difference and/or a depth difference of the cargo in two adjacent frames of depth images; and execute an emergency driving strategy in the driving strategies if the height difference and/or the depth difference are/is greater than their/its preset threshold(s).

Further, the cargo value determining module 720 is configured to:

obtain highest point information of the cargo if there is a depth value less than a fixed depth value in the depth image, wherein the fixed depth value is a vertical distance value from the depth camera to an outermost side of the picking-and-placing component in the high-position robot; and determine the height value and/or the depth value of the highest point of the cargo according to the parameter information of the depth camera and the highest point information of the cargo.

Seventeenth Embodiment

Figure 19:
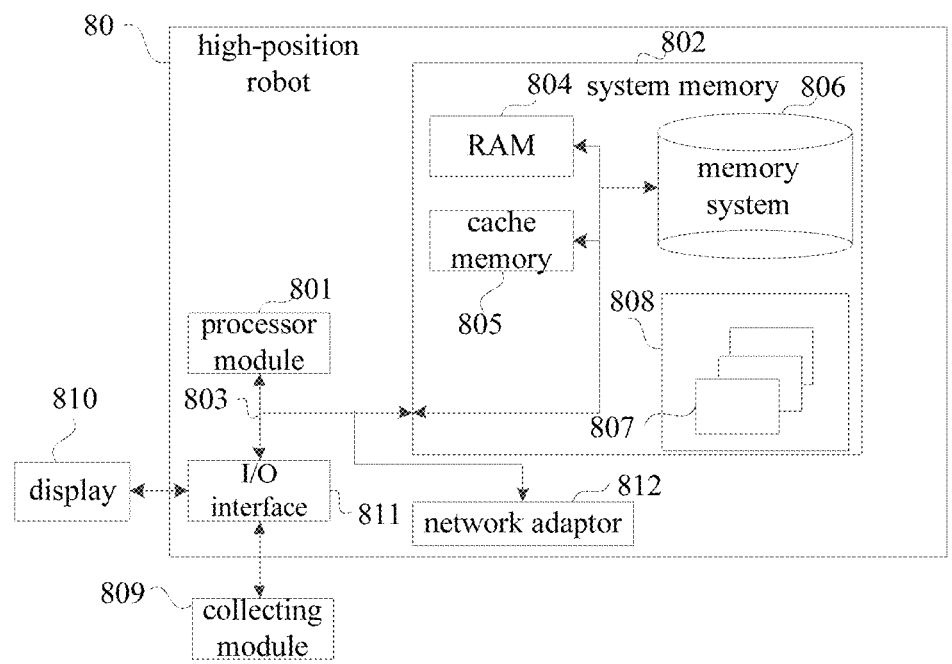
FIG. 19 is a schematic structural diagram of a high-position robot according to the seventh embodiment of the present invention.

FIG. 19 is a schematic structural diagram of a high-position robot according to the seventh embodiment of the present invention. FIG. 1 shows a block diagram of an exemplary high-position robot 80 suitable for implementing embodiments of the present invention. The high-position robot 80 shown in FIG. 1 is merely an example and should not impose any limitation on the functionality and scope of use of the embodiments of the present invention. In at least one embodiment, the high-position robot 80 may be a device for implementing the method for determining a driving strategy according to any embodiment of the present invention.

As shown in FIG. 19, the high-position robot 80 is represented in the form of a general-purpose computing device. The high-position robot 80 can execute the method for determining a driving strategy according to any embodiment of the present invention and has corresponding functional modules for executing the method and achieves corresponding beneficial effects. The components of the high-position robot 80 may include, but are not limited to, a collecting module 809 and a processor module 801. The collecting module 809 and the processor module 801 are electrically connected. The high-position robot 80 may further include a system memory 802 and a bus 803 connecting different system components (including the system memory 802 and the processor module 801). In at least one embodiment, the collecting module 809 configured on the high-position robot 80 may serve as a depth camera. In at least one embodiment, under the control of the processor module 801, the depth camera may collect a depth image in a specified azimuth according to a preset period and send the collected depth image to the processor module 801, so that the processor module 801 can determine the height value and the depth value of the cargo according to the received depth image and the parameter information of the depth camera; and then the driving strategy is determined according to the height value and/or the depth value of the cargo. Communication between the collecting module 809 and the processor module 801 may be performed through an input/output (I/O) interface 811. Moreover, the high-position robot 80 may also communicate with one or more networks (such as a local area network (LAN), a wide area network (WAN), and/or a public network, for example, the Internet) via a network adapter 812. As shown in the FIG. 19, the network adapter 812 communicates with other modules of the high-position robot 80 via the bus 803. It should be appreciated that although not shown in the figure, other hardware and/or software modules, including, but not limited to, microcode, device drivers, redundant processing units, external magnetic disk drive arrays, RAID systems, tape drives, data backup memory systems, etc., may be used in conjunction with the high-position robot 80.

The bus 803 represents one or more of several types of bus architectures, including a memory bus or a memory controller, a peripheral bus, a graphics acceleration port, a processor, or a local bus using any of a variety of bus architectures. For example, these architectures include, but are not limited to, an industry standard architecture (ISA)

bus, a microchannel architecture (MAC) bus, an enhanced ISA bus, a video electronic standard association (VESA) local bus, and a peripheral component interconnects PCI bus.

The high-position robot 80 typically includes a variety of computer system readable media. These media may be any available medium that can be accessed by the high-position robot 80, including volatile and nonvolatile media, and mobile and non-immobile media.

The system memory 802 may include a computer system readable medium in the form of a volatile memory, such as a random access memory (RAM) 804 and/or a cache memory 805. The high-position robot 80 may further include other mobile/non-immobile, volatile/nonvolatile computer system storage media. By way of example only, a memory system 806 may be used to read and write a non-removable nonvolatile magnetic medium (not shown in FIG. 19, commonly referred to as a "hard disk drive"). Although not shown in FIG. 9, a disk drive for reading and writing a mobile nonvolatile magnetic disk (e.g., a "floppy disk") and an optical disk drive for reading and writing a mobile nonvolatile compact disc (e.g., a CD-ROM, DVD-ROM or other optical media) may be provided. In these cases, each drive may be connected to the bus 803 via one or more data medium interfaces. The memory 802 may include at least one program product having a set of (e.g., at least one) program modules, and these program modules are configured to perform the functions of the various embodiments of the present invention.

A program/utility tool 808 having a set of (at least one) program modules 807 may be stored in, for example, the system memory 802. Such program modules 807 include, but are not limited to, an operating system, one or more application programs, and other program modules and program data, each or a combination of these examples may include an implementation in a network environment. The program module 807 generally performs the functions and/or methods in the embodiments described in the present invention.

The processor module 801 executes various functional applications and data processing by running programs stored in the system memory 802, for example, to implement the method for determining a driving strategy according to the embodiment of the present invention.

In some embodiments, the processor module 801 is configured to control the depth camera to start if it is determined that the high-position robot obtains a cargo and a picking-and-placing component is in a home state.

The depth camera 809 is configured to collect a depth image in a specified position according to a preset period.

The processor module 801 is further configured to determine a height value and/or a depth value of the cargo according to parameter information of the depth camera and a depth image collected by the depth camera and to determine a driving strategy according to the height value and/or the depth value of the cargo.

Further, the height value and the depth value of the cargo are a height value and a depth value of a highest point of the cargo. The height value of the highest point of the cargo is used to represent a vertical distance from the highest point of the cargo to a bottom of the picking-and-placing component in the high-position robot; the depth value of the highest point of the cargo is used to represent a distance from the highest point of the cargo to the depth camera.

Further, the processor module 801 may include:

a depth value determining unit configured to determine the depth value of the highest point of the cargo according to pixel coordinates of the highest point of the cargo in the depth image;

an included angle determining unit configured to determine a horizontal included angle between the highest point of the cargo and the depth camera according to the pixel coordinates of the highest point of the cargo in the depth image, and a vertical field angle and a resolution in the parameter information; and a height value determining unit configured to determine the height value of the highest point of the cargo according to the horizontal included angle, the depth value of the highest point of the cargo, and installation position information in the parameter information.

Further, the height value determining unit is configured to:

determine a vertical height of the highest point of the cargo relative to the depth camera according to the horizontal included angle and the depth value of the highest point of the cargo; and determine the height value of the highest point of the cargo according to the vertical height and installation position information in the parameter information.

Further, when determining the driving strategy according to the height value of the cargo, the processor module 801 can be configured to:

determine an obstacle avoidance height according to the height value of the cargo and a height value of a body of the high-position robot; and formulate an obstacle avoidance driving strategy in driving strategies according to the obstacle avoidance height so that the high-position robot travels from the current position to a target position according to the obstacle avoidance driving strategy.

Further, when determining the driving strategy according to the height value and/or the depth value of the cargo, the processor module 801 is further configured to:

determine a height difference and/or a depth difference of the cargo in two adjacent frames of depth images; and execute an emergency driving strategy in the driving strategies if the height difference and/or the depth difference are/is greater than a preset threshold.

Further, when determining the height value and/or the depth value of the highest point of the cargo according to the parameter information of the depth camera and the depth image collected by the depth camera, the processor module 801 may be configured to:

obtain highest point information of the cargo if there is a depth value less than a fixed depth value in the depth image, wherein the fixed depth value is a vertical distance value from the depth camera to an outermost side of the picking-and-placing component in the high-position robot; and determine the height value and/or the depth value of the highest point of the cargo according to the parameter information of the depth camera and the highest point information of the cargo.

Eighteenth Embodiment

The eighth embodiment of the present invention further provides a computer-readable storage medium, having a computer program stored thereon, and the program implements the method for determining a driving strategy according to the forgoing embodiment when executed by a processor.

It should be noted that the above description only provide some preferred embodiments of the present invention and the technical principles applied thereto. Those skilled in the art will appreciate that the present invention is not limited to the specific embodiments described herein, and that various modifications, changes and substitutions may be made without departing from the scope of the present invention. Therefore, while the present invention has been described in detail by the above embodiments, the present invention is not limited to the above embodiments, and other equivalent embodiments may be included without departing from the inventive concept. The scope of the present invention is determined by the scope of the appended claims.

What is claimed is:

1. A high-position robot, comprising a pallet fork, an image collector, a distance sensor, and a processing adjusting and control module, the processing adjusting and control module being separately connected with the pallet fork, the image collector and the distance sensor electrically,
    wherein the pallet fork comprises a first pallet fork and a second pallet fork configured to carry a storage container to be placed;
    the image collector is arranged on the first pallet fork and configured to collect positioning information provided on a target stock container to obtain image data that can represent a positional relationship between the pallet fork and a projection image of the positioning information on a specified plane;
    the distance sensor is arranged on the second pallet fork and configured to measure a distance between the pallet fork and the target stock container and obtain distance data; and
    the processing adjusting and control module is configured to adjust and control the positional relationship between the pallet fork and the projection image of the positioning information on the specified plane according to the image data after the pallet fork lifts the storage container to be placed up to a same height as a target layer of the target stock container; and to adjust and control the distance between the pallet fork and the target stock container according to the distance data;
    wherein an attribute of the storage container comprises a width of the storage container; and
    the processing adjusting and control module is further configured to:
        sum a distance between a front end of the pallet fork and the target stock container collected by the distance sensor and the width of the storage container, an obtained sum value being regarded as a horizontal distance the pallet fork needs to move towards the target stock container when returning the storage container.

2. The high-position robot according to claim 1, wherein the processing adjusting and control module comprises:
    a target position adjusting unit configured to control the pallet fork to move to a target position according to a position of the collected positioning information in an image taken by the image collector, wherein at the target position, the projection image corresponding to the positioning information is located in a preset standard position in the image taken by the image collector; and
    a vertical moving unit configured to control the pallet fork to move vertically upwards from the target position by a preset distance, to extend the storage container carried by the pallet fork into storage space of the target stock container without hindrance, wherein the preset distance is determined according to a height of the positioning information and a height of a bottom face of the target layer of the target stock container.

3. The high-position robot according to claim 2, wherein the processing adjusting and control module further comprises:
    a determining unit configured to determine whether an angle deviation of the collected positioning information in a horizontal direction is greater than a preset angle threshold according to the position of the collected positioning information in the image taken by the image collector before the vertical moving unit moves the pallet fork vertically upwards from the target position by the preset distance; and
    a target distance determining unit configured to determine a height of a lowest position of the storage container according to the angle deviation and an attribute of the storage container when the determining unit determines that the angle deviation of the collected positioning information in the horizontal direction is greater than the preset angle threshold; and then calculate a target distance based on the height of the lowest position of the storage container and the height of the bottom face of the target layer of the target stock container; and control the pallet fork to move vertically upwards from the target position by the target distance, wherein the attribute of the storage container comprises a length of the storage container; or
    the vertical moving unit is further configured to move the pallet fork vertically upwards from the target position by the preset distance when the determining unit determines that the angle deviation of the collected positioning information in the horizontal direction is not greater than the preset angle threshold.

4. The high-position robot according to claim 1, wherein the processing adjusting and control module is further configured to:
    instruct the high-position robot to carry the storage container and move to a preset position, wherein the preset position is located right in front of the target stock container and a distance from the preset position to the target stock container is within a pre-configured distance interval.

5. The high-position robot according to claim 1, wherein the positioning information is fixedly provided in a fixed position on each layer of the target stock container, wherein the fixed position comprises a position on the target layer of the target stock container and right opposite to the image collector arranged on the pallet fork after the pallet fork lifts the storage container up to the same height as the target layer of the target stock container.

6. The high-position robot according to claim 1, wherein the processing adjusting and control module is further configured to:
    exit the pallet fork and control the pallet fork to be lowered to an initial position after the storage container is returned.

7. A method for calibrating a storage container, executed by a high-position robot, the high-position robot comprising a pallet fork, an image collector and a distance sensor being arranged on the pallet fork, the image collector being configured to collect positioning information provided on a target stock container to obtain image data that can represent a positional relationship between the pallet fork and a projection image of the positioning information on a specified plane, the distance sensor being configured to measure a distance between the pallet fork and the target stock container and obtain distance data, the method comprising:

adjusting and controlling the positional relationship between the pallet fork and the projection image of the positioning information on the specified plane according to the image data after the pallet fork lifts a storage container to be placed up to a same height as a target layer of the target stock container; and adjusting and controlling the distance between the pallet fork and the target stock container according to the distance data;

wherein an attribute of the storage container comprises a width of the storage container; and the adjusting and controlling a distance between the pallet fork and the target stock container according to the distance data comprises:

summing a distance between a front end of the pallet fork and the target stock container collected by the distance sensor and the width of the storage container, an obtained sum value being regarded as a horizontal distance the pallet fork needs to move towards the target stock container when returning the storage container.

8. The method according to claim 7, wherein the adjusting and controlling the positional relationship between the pallet fork and the projection image of the positioning information on the specified plane according to the image data comprises:

adjusting the pallet fork to a target position by moving the pallet fork according to a position of the collected positioning information in an image taken by the image collector, wherein at the target position, the projection image corresponding to the positioning information is located in a preset standard position in the image taken by the image collector; and moving the pallet fork vertically upwards from the target position by a preset distance, to extend the storage container carried by the pallet fork into storage space of the target stock container without hindrance, wherein the preset distance is determined according to a height of the positioning information and a height of a bottom face of the target layer of the target stock container.

9. The method according to claim 8, wherein before moving the pallet fork vertically upwards from the target position by the preset distance, the adjusting and controlling the positional relationship between the pallet fork and the projection image of the positioning information on the specified plane according to the image data further comprises:

determining whether an angle deviation of the collected positioning information in a horizontal direction is greater than a preset angle threshold according to the position of the collected positioning information in the image taken by the image collector; and if yes, determining a height of a lowest position of the storage container according to the angle deviation and an attribute of the storage container, and then determining a target distance based on the height of the lowest position of the storage container and the height of the bottom face of the target layer of the target stock container, and moving the pallet fork vertically upwards from the target position by the target distance, the attribute of the storage container comprising a length of the storage container; or if not, executing the moving the pallet fork vertically upwards from the target position by the preset distance.

10. The method according to claim 7, wherein before the pallet fork lifts storage container to be placed up to a same height as the target layer of the target stock container, the method further comprises:

carrying the storage container and moving to a preset position, wherein the preset position is located right in front of the target stock container and a distance from the preset position to the target stock container is within a pre-configured distance interval.

11. The method according to claim 7, wherein the positioning information is fixedly provided in a fixed position on each layer of the target stock container, wherein the fixed position comprises a position on the target layer of the target stock container and right opposite to the image collector arranged on the pallet fork after the pallet fork lifts the storage container up to the same height as the target layer of the target stock container.

12. The method according to claim 7, wherein after returning the storage container, the method further comprises:

exiting the pallet fork and controlling the pallet fork to be lowered to an initial position.

13. A computer-readable storage medium, having a computer program stored thereon, wherein when executed by a processor the computer program implements the method according to claim 8.

14. The high-position robot according to claim 1, wherein the processing adjusting and control module is connected to the pallet fork through a driving mechanism and controls the pallet fork to move through the driving mechanism.

15. The high-position robot according to claim 1, wherein the image collector is arranged at a front end of the first pallet fork.

16. The high-position robot according to claim 1, wherein the distance sensor is arranged at a front end of the second pallet fork.

* * * * *